United States Patent
Ogawa

(10) Patent No.: US 10,419,683 B2
(45) Date of Patent: Sep. 17, 2019

(54) ZOOM CONTROL DEVICE, IMAGING APPARATUS, CONTROL METHOD OF ZOOM CONTROL DEVICE, AND RECORDING MEDIUM

(71) Applicant: CANON KABUSHIKI KAISHA, Tokyo (JP)

(72) Inventor: Seiji Ogawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/985,542

(22) Filed: May 21, 2018

(65) Prior Publication Data

US 2018/0270426 A1    Sep. 20, 2018

Related U.S. Application Data

(63) Continuation of application No. 14/976,111, filed on Dec. 21, 2015, now Pat. No. 10,015,406.

(30) Foreign Application Priority Data

Dec. 24, 2014   (JP) .................................. 2014-260110

(51) Int. Cl.
   *H04N 5/232* (2006.01)
   *G06K 9/00* (2006.01)

(52) U.S. Cl.
   CPC ..... *H04N 5/23296* (2013.01); *G06K 9/00228* (2013.01); *H04N 5/23219* (2013.01); *H04N 5/23222* (2013.01); *H04N 5/23293* (2013.01)

(58) Field of Classification Search
   CPC ............... H04N 5/23296; H04N 5/232; H04N 5/23293; H04N 5/23222; H04N 5/23219;
   (Continued)

(56) References Cited

U.S. PATENT DOCUMENTS

| 7,248,294 B2 * | 7/2007 | Slatter ................ H04N 5/23222 348/240.99 |
| 8,446,517 B2 | 5/2013 | Kawai |

(Continued)

FOREIGN PATENT DOCUMENTS

| JP | 2011-188065 A | 9/2011 |
| JP | 2012-95019 A | 5/2012 |
| JP | 2013-074454 A | 4/2013 |

*Primary Examiner* — Pritham D Prabhakher
(74) *Attorney, Agent, or Firm* — Venable LLP

(57) ABSTRACT

A subject detection unit of an imaging apparatus detects a subject image from an image. An automatic zoom control unit designates the subject image detected by the subject detection unit and cancels the designation. The automatic zoom control unit automatically selects a specific composition among a plurality of compositions and sets a reference size of the subject image used to control a zoom magnification based on the elected composition. The automatic zoom control unit controls the zoom magnification based on the reference size and a size of the subject image sequentially detected by the subject detection unit. At least one of composition selection candidates selected by the automatic zoom control unit is different according to whether the subject image is designated by the automatic zoom control unit.

19 Claims, 24 Drawing Sheets

(58) Field of Classification Search
CPC ......... H04N 5/23216; H04N 2005/443; H04N 1/00411; H04N 1/00413; G06T 7/60; G06K 9/52; G06K 9/00228; G06K 9/00221; G06F 3/03547
USPC ...................................................... 348/240.1
See application file for complete search history.

(56) References Cited

U.S. PATENT DOCUMENTS

| | | | |
|---|---|---|---|
| 8,531,557 B2 * | 9/2013 | Wan | H04N 5/232 348/143 |
| 8,659,681 B2 | 2/2014 | Kim | |
| 8,817,134 B2 | 8/2014 | Yoshizumi | |
| 8,817,161 B2 | 8/2014 | Hosoe | |
| 8,947,527 B1 * | 2/2015 | Postovalov | H04N 7/183 348/142 |
| 9,077,895 B2 | 7/2015 | Nagata | |
| 9,204,053 B2 * | 12/2015 | Matsuzawa | H04N 5/23296 |
| 9,363,442 B2 * | 6/2016 | Wang | H04N 5/23296 |
| 9,621,813 B2 | 4/2017 | Hanzawa et al. | |
| 9,661,232 B2 | 5/2017 | Posa et al. | |
| 9,679,394 B2 | 6/2017 | Yoshizumi | |
| 2005/0041111 A1 | 2/2005 | Matsuoka | |
| 2007/0242143 A1 * | 10/2007 | Sugimoto | H04N 5/23293 348/240.2 |
| 2010/0020221 A1 | 1/2010 | Tupman et al. | |
| 2010/0315542 A1 | 12/2010 | Yoshino | |
| 2011/0122253 A1 * | 5/2011 | Kino | H04N 5/23212 348/169 |
| 2011/0149120 A1 * | 6/2011 | Kubota | H04N 5/232 348/240.99 |
| 2011/0243538 A1 | 10/2011 | Morimoto | |
| 2011/0267499 A1 * | 11/2011 | Wan | H04N 5/232 348/231.99 |
| 2012/0038796 A1 * | 2/2012 | Posa | H04N 5/23296 348/240.2 |
| 2012/0062692 A1 * | 3/2012 | Tsubusaki | H04N 5/23296 348/36 |
| 2012/0098992 A1 | 4/2012 | Hosoe | |
| 2012/0133822 A1 | 5/2012 | Kawai | |
| 2013/0076945 A1 | 3/2013 | Nagata | |
| 2013/0107018 A1 * | 5/2013 | Sakurabu | H04N 5/23219 348/49 |
| 2013/0120617 A1 | 5/2013 | Kim | |
| 2013/0120618 A1 * | 5/2013 | Wang | H04N 5/23296 348/240.99 |
| 2013/0208168 A1 | 8/2013 | Kim et al. | |
| 2013/0235086 A1 * | 9/2013 | Otake | H04N 5/23293 345/660 |
| 2013/0265467 A1 * | 10/2013 | Matsuzawa | H04N 5/23296 348/240.1 |
| 2013/0286240 A1 | 10/2013 | Kim et al. | |
| 2014/0139667 A1 | 5/2014 | Kang | |
| 2014/0184726 A1 * | 7/2014 | Kim | H04N 7/147 348/14.07 |
| 2014/0307147 A1 | 10/2014 | Hanzawa et al. | |
| 2016/0094790 A1 | 3/2016 | Yu | |
| 2016/0191810 A1 | 6/2016 | Tsubusaki | |
| 2016/0191811 A1 | 6/2016 | Tsubusaki | |
| 2016/0191812 A1 | 6/2016 | Tsubusaki | |

* cited by examiner

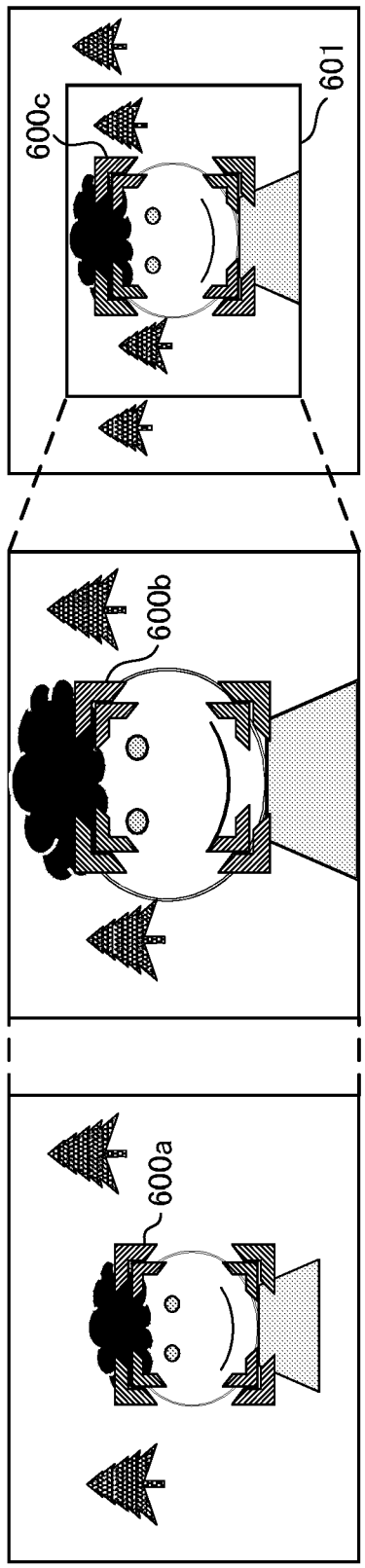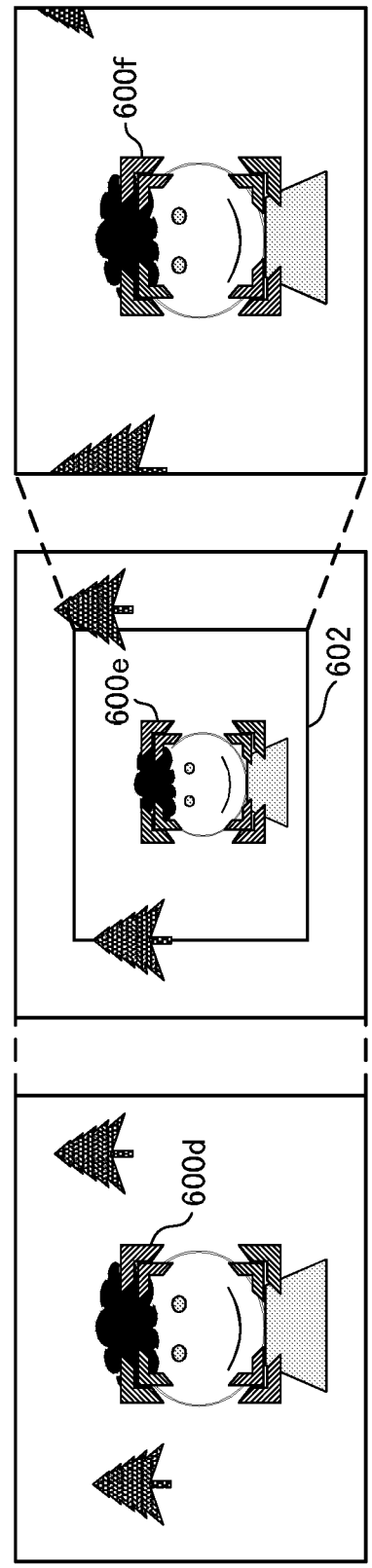

FIG. 22

| Composition | Number of faces for estimating subject position | | |
|---|---|---|---|
| | Shoulder (Ns) | Head (Nh) | Body (Nb) |
| Face | 1 | 1.5 | 1.5 |
| Upper body | 2 | 1.5 | 5 |
| Whole body | 2 | 1.5 | 10 |
| Multiple people | 2 | 1.5 | 3.5 |

ZOOM CONTROL DEVICE, IMAGING APPARATUS, CONTROL METHOD OF ZOOM CONTROL DEVICE, AND RECORDING MEDIUM

This application is a continuation of application Ser. No. 14/976,111 filed Dec. 21, 2015, currently pending; and claims priority under 35 U.S.C. § 119 to Japan Application 2014-260110 filed in Japan on Dec. 24, 2014; and the contents of all of which are incorporated herein by reference as if set forth in full.

BACKGROUND OF THE INVENTION

Field of the Invention

The present invention relates to a technology for detecting a subject image from an image and controlling zoom magnification.

Description of the Related Art

In the related art, there are imaging apparatuses that have a function of driving a zoom lens and performing optical magnification (hereinafter referred to as optical zoom) and a function of expanding a part of a photographed image and performing electronic magnification (hereinafter referred to as electronic zoom). The imaging apparatuses also have an automatic zoom function (automatic magnification) of automatically changing a zoom magnification according to detection information of subjects. Hereinafter, an optical zoom operation and an electronic zoom operation are collectively referred to as a zoom operation.

Japanese Patent Laid-Open No. 2013-74454 discloses an automatic zoom function of selecting a single subject or a plurality of subjects in a live view and automatically changing a zoom magnification so that the single subject or all of the plurality of subjects are fitted in an angle of view. Accordingly, users can prevent a person who was originally not intended as a subject from being subjected to the automatic zoom function, and thus photographing can be performed with compositions intended by photographers.

In Japanese Patent Laid-Open No. 2013-74454, however, main subjects are merely fitted in an angle of view irrespective of the number of people serving as main subjects designated by the users in the above-described automatic zoom function. That is, there is no disclosure regarding supply of an optimum composition according to the number of people serving as main subjects. For example, when the number of main subjects decreases by one person from a state in which subjects of a plurality of people are detected with cameras, a zoom operation is not automatically performed so that an optimum composition is realized according to the number of people. In this case, there is a possibility of an image of one person serving as a main subject being very small in the composition.

SUMMARY OF THE INVENTION

According to an aspect of the invention, a composition is selected according to presence or absence of designation of a subject to perform automatic zoom control.

According to an aspect of the present invention, there is provided a zoom control device including: a subject detection unit configured to detect a subject image from an image; a designation unit configured to designate the subject image detected by the subject detection unit and cancel the designation; a composition selection unit configured to automatically select a specific composition among a plurality of compositions; a setting unit configured to set a reference size of the subject image used to control a zoom magnification based on the composition selected by the composition selection unit; and a control unit configured to control the zoom magnification based on the reference size set by the setting unit and a size of the subject image sequentially detected by the subject detection unit. At least one of composition selection candidates selected by the composition selection unit is different according to whether the subject image is designated by the designation unit.

Further features of the present invention will become apparent from the following description of exemplary embodiments (with reference to the attached drawings).

BRIEF DESCRIPTION OF THE DRAWINGS

FIGS. 6A and 6B are explanatory diagrams illustrating a process of preventing a change in a size of a subject (person) inside a screen.

FIG. 22 is a table illustrating the number of faces for estimating the subject position.

DESCRIPTION OF THE EMBODIMENTS

Hereinafter, preferred embodiments of the invention will be described with reference to the drawings. In the embodiments to be described below, a case in which the invention is applied to a digital camera including a zoom magnification changing unit and capable of capturing a still image and a moving image as an imaging device and its control unit will be exemplified.

Figure 1A:
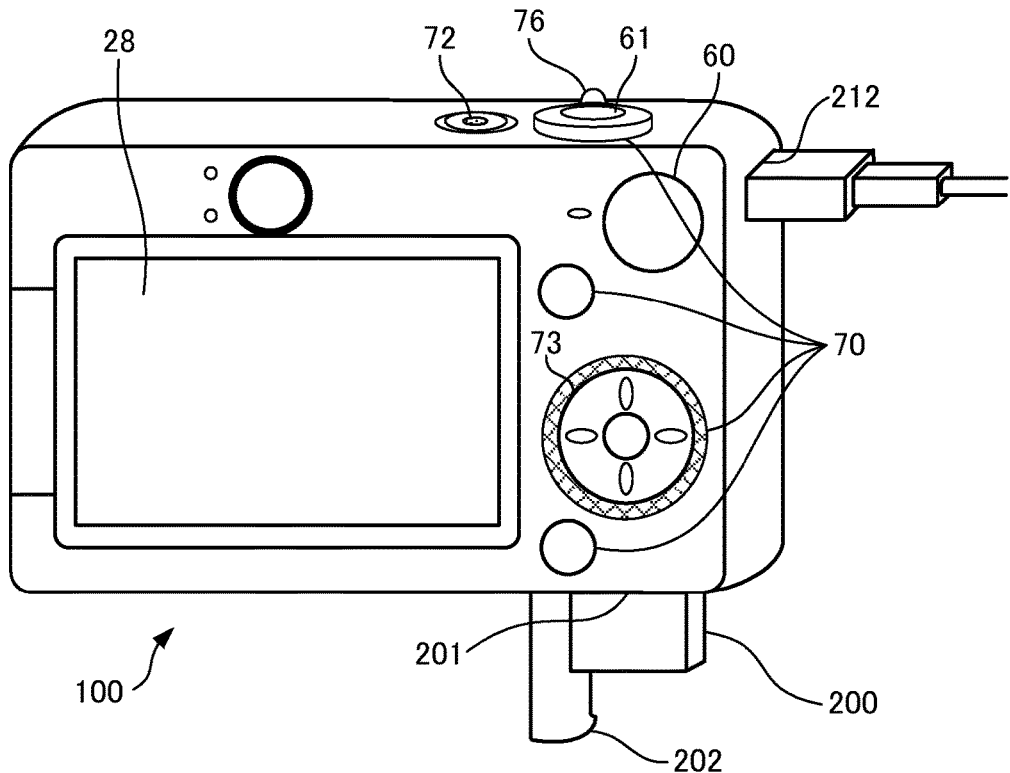
FIGS. 1A and 1B are exterior diagrams illustrating a digital camera according to an embodiment of the invention.
Figure 1B:
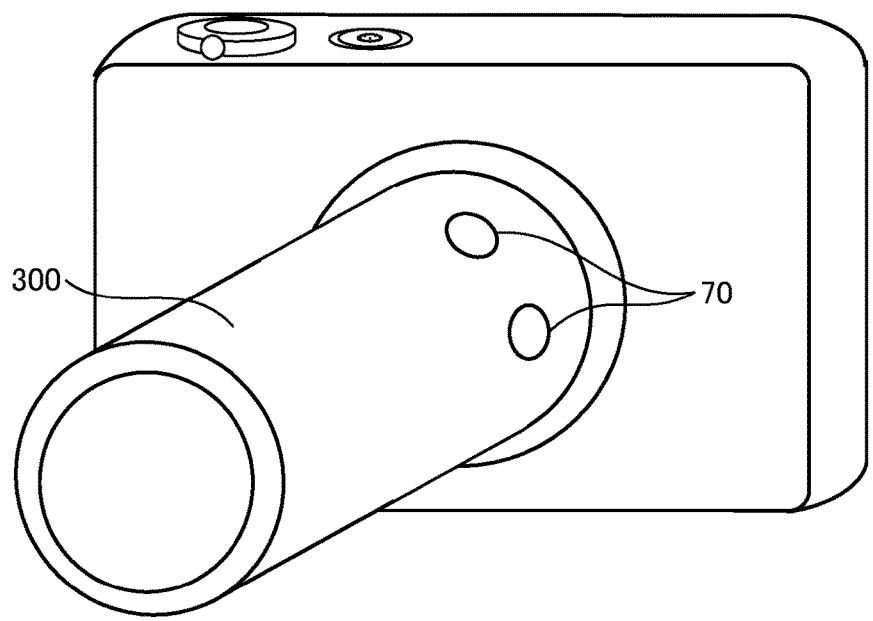

FIGS. 1A and 1B are exterior diagrams illustrating a digital camera which is an example of an imaging device according to the invention. FIG. 1A is an exterior diagram illustrating the digital camera from behind and FIG. 1B is an exterior diagram illustrating the front of the digital camera.

In FIG. 1A, a display unit 28 display images or various kinds of information. A shutter button 61 is a manipulation member used for a user to perform a photographing instruction. A mode changeover switch 60 is a manipulation member used for the user to switch various modes. A connector 212 is a connection member for connecting a connection cable to a digital camera 100. A manipulation unit 70 includes manipulation members such as various switches, buttons, and a touch panel receiving various manipulations of the user. A controller wheel 73 is a manipulation member that is included in the manipulation unit 70 and can be rotatably manipulated. A power switch 72 is a manipulation member that is used by the user to turn the power on or off. A zoom lever 76 is a manipulation member that is used by the user to change a zoom magnification. A recording medium 200 is, for example, a memory card or a hard disk and is used to record image data or the like. The recording medium 200 is accommodated through the recording medium slot 201. The recording medium 200 accommodated in a recording medium slot 201 can communicate with the digital camera 100. A lid 202 is an openable lid of the recording medium slot 201.

As illustrated in FIG. 1B, the manipulation unit 70 is also disposed on the front of the casing of the digital camera. The manipulation unit 70 may be located on a side surface portion of a barrel unit 300. Further, assignment of functions to the manipulation unit 70 is performed with an automatic zoom manipulation switch to be described below. By disposing the automatic zoom manipulation switch in this way, convenience for the user is improved. In particular, in the digital camera that the user uses for photographing while supporting the barrel unit 300 with his or her hand, setting can be changed without the user removing his or her hand from the barrel unit 300.

Figure 2:
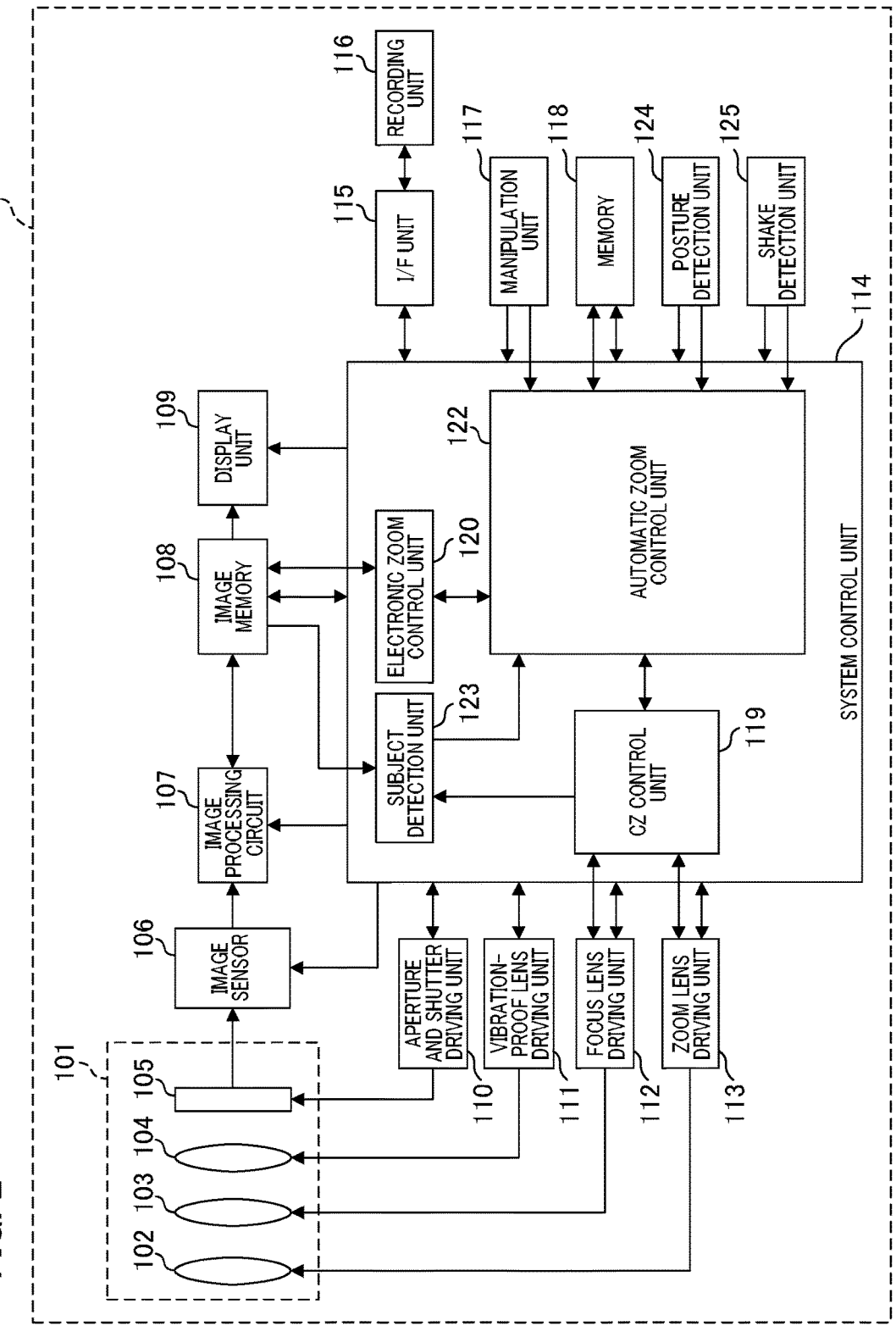
FIG. 2 is a block diagram illustrating an example of the configuration of a digital camera according to an embodiment of the present invention.

FIG. 2 is a block diagram illustrating an example of the configuration of the digital camera 100 that is an example of an imaging device including a zoom control device according to the embodiment. The digital camera 100 is configured such that an automatic zoom function can be performed.

A lens group is held in a lens barrel 101. A zoom lens 102 is moved in an optical axis direction of the lens barrel 101 to adjust a focal distance and optically change an angle of view (move a zoom position). A focus lens 103 is moved in the optical axis direction of the lens barrel 101 to perform focusing. A vibration-proof lens (image blur correction lens) 104 corrects image blur caused due to camera shake or the like. An aperture and shutter 105 that adjust an amount of light are used for exposure control. In the embodiment, the digital camera 100 is an imaging apparatus in which the lens barrel 101 and a camera body are integrated, but the invention is not limited thereto. The embodiment can also be applied to an imaging system configured to include a camera body and an interchangeable lens detachably mounted on the camera body.

An image sensor 106 generates an imaging signal by receiving light passing through the lens barrel 101 and converting a subject image into an electric signal through photoelectric conversion. The image sensor 106 is, for example, a charge-coupled device (CCD) type or a complementary metal oxide semiconductor (CMOS) type image sensor. The imaging signal generated by the image sensor 106 is input to an image processing circuit 107 and is subjected to various processes such as a pixel interpolation process and a color conversion process. Image data after the various processes is stored in an image memory 108. The image memory 108 is a storage device such as a dynamic random access memory (DRAM) or a static random access memory (SRAM).

The display unit 109 is configured to include a thin film transistor (TFT) drive type liquid crystal display (LCD) and displays a photographed image (image data) or specific information (for example, photographed information). An electronic viewfinder (EVF) function by which a photographer performs alignment of an angle of view can be provided through information display such as live view related to a photographed image.

An aperture and shutter driving unit 110 calculates exposure control values (an aperture value and a shutter speed) based on luminance information obtained through image processing in the image processing circuit 107 and drives the aperture and shutter 105 based on a calculation result. In this way, automatic exposure (AE) control is performed. A vibration-proof lens driving unit 111 calculates a deflection amount applied to the digital camera 100 based on deflection detection information by an angular velocity sensor such as a gyro sensor. Depending on the calculation result, the vibration-proof lens 104 is driven so that the deflection amount applied to the digital camera 100 is cancelled (reduced).

A focus lens driving unit 112 drives the focus lens 103. In the embodiment, the digital camera 100 performs automatic focusing (AF) control according to a contrast scheme. That is, based on focusing information (contrast evaluation value) of a photographing optical system obtained through image processing in the image processing circuit 107, the focus lens driving unit 112 drives the focus lens 103 so that a subject comes into focus. However, the invention is not limited thereto, but a phase difference AF scheme may be used as the AF control instead of the contrast scheme. Further, the AF control may be performed according to a plurality of schemes such as a combination of the contrast scheme and another scheme.

A zoom lens driving unit 113 drives the zoom lens 102 according to a zoom manipulation instruction. A manipulation unit 117 includes a zoom lever or a zoom button as a zoom manipulation member used for the photographer to instruct the camera to perform zooming. A system control unit 114 performs control of detecting a manipulation amount and a manipulation direction of the zoom manipulation member used for a zoom instruction manipulation, calculating a zoom driving speed or a zoom driving direction, and moving the zoom lens 102 in an optical axis according to a calculation result.

Image data generated through a photographing operation is transmitted to a recording unit 116 via an interface (I/F) unit 115 to be stored. The image data is recorded in one or both of an external recording medium and a nonvolatile memory 118. The external recording medium is, for example, a memory card that is mounted on the digital camera 100 for use. The nonvolatile memory 118 is a storage medium embedded in the digital camera 100. The memory 118 stores not only program data or image data but also setting information of the digital camera 100 or information regarding a zoom-in position or the like in an automatic zoom function to be described below.

A manipulation unit 117 includes a release switch for instructing photographing start and an automatic zoom manipulation switch for instructing start or end of the automatic zoom function in addition to the foregoing zoom manipulation member. A signal from the manipulation unit 117 is transmitted to the system control unit 114.

The system control unit 114 includes a calculation device such as a central processing unit (CPU). The system control unit 114 controls the entire digital camera 100 by transmitting a control command to each unit in response to a manipulation of the photographer. The system control unit 114 executes various control programs stored in the memory 118, for example, programs for performing control of the image sensor 106, AE/AF control, zoom control (including an automatic zoom process), and the like.

Figure 3:
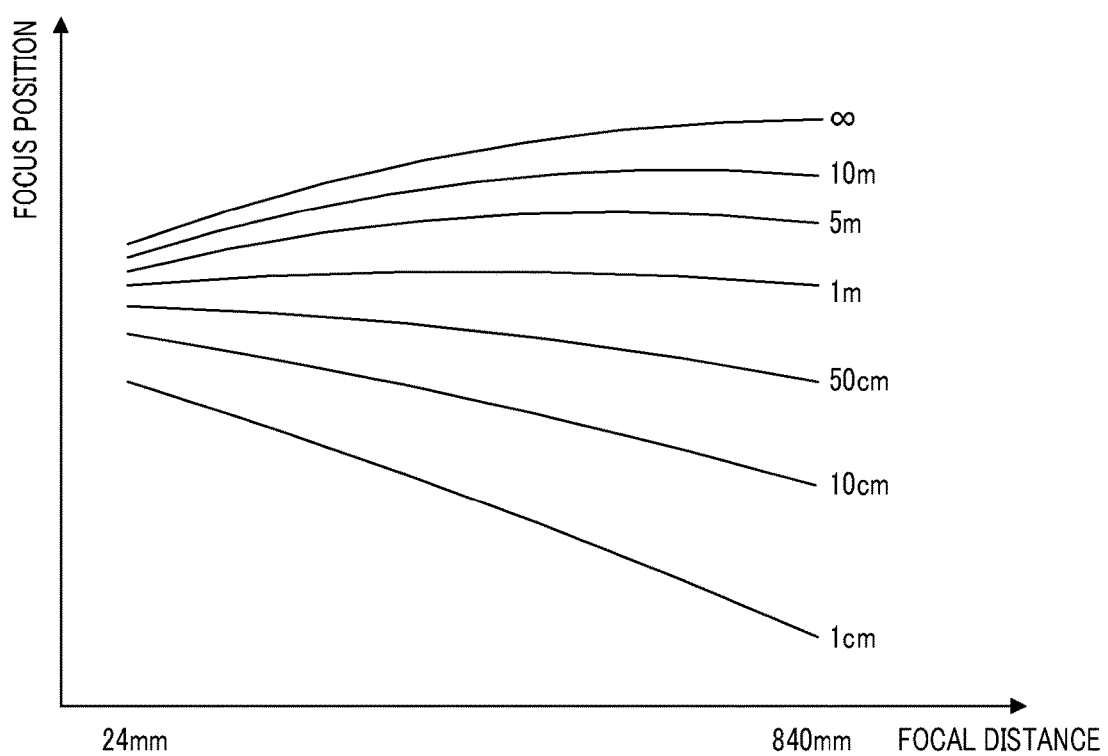
FIG. 3 is a diagram exemplifying a relation between a focal distance and the position of a focus lens for each subject distance.

To maintain a focused state when an angle of view is changed through optical zoom, it is necessary to move the focus lens 103 to an appropriate focus position according to the position of the zoom lens 102 when the lens barrel 101 is of a rear focus type. Such control is referred to as computer zoom (CZ) control and is performed by a CZ control unit 119 in the system control unit 114. FIG. 3 is a diagram exemplifying a relation between a focal distance of the zoom lens and a focus position for each subject distance. In FIG. 3, the relation between the focal distance of the zoom lens and the focused focus position is graphed as a data table indicated for each distance up to a subject. In the embodiment, the table is referred to as a focus cam table. In FIG. 3, the horizontal axis represents the focal distance corresponding to the zoom position and the vertical axis represents the focus position. A distance (subject distance) from the digital camera 100 to a subject is exemplified on the side of each graph line.

The system control unit 114 performs a scan operation by controlling the focus lens driving unit 112 and moving the focus lens 103 within a predetermined range when the AF control is performed. A focus position which is a focused point is detected using a contrast evaluation value or the like obtained during a scan operation according to a known method. A subject distance is measured using the zoom position and the focus position at that time with reference to the focus cam table.

Next, control related to the automatic zoom function in the system control unit 114 will be described. As illustrated in FIG. 1, the system control unit 114 includes the CZ control unit 119, an electronic zoom control unit 120, an automatic zoom control unit (hereinafter referred to as an AZ control unit) 122, and a subject detection unit 123.

The digital camera 100 has an optical zoom function and an electronic zoom function, and the CZ control unit 119 and the zoom lens driving unit 113 serve to control the optical zoom. The CZ control unit 119 detects a zoom position of the zoom lens 102 for each predetermined control period at the time of a zoom operation. Then, the CZ control unit 119 performs control of driving the focus lens 103 to track the focus cam table at a subject distance measured in the AF control according to the detected zoom position. In this way, it is possible to perform the optical zoom operation while maintaining the focused state.

On the other hand, the electronic zoom control unit 120 and the image memory 108 serve to control the electronic zoom. The electronic zoom control unit 120 realizes the electronic zoom function by clipping data in a target region from image data transmitted to the image memory 108. The electronic zoom control unit 120 realizes smooth electronic zoom display by causing the display unit 109 to perform display while gradually increasing a range clipped at a frame rate period of an image captured in the image sensor 106.

The subject detection unit 123 detects a desired subject region from image data stored in the image memory 108. In the embodiment, a subject detection method (a face detection process or a color detection process) of detecting a subject (the face of a person or the like or an object) based on face information or color information included in the image data will be described.

The face detection process is a process of detecting a face region present in image data by a known algorithm. For example, the subject detection unit 123 extracts a feature amount from a rectangular partial region on the image data and compares the feature amount to a feature amount of a face prepared in advance. Then, the subject detection unit 123 determines that the partial region is a face region when a correlation value of both features exceeds a predetermined threshold value. By repeating this determination process while changing a combination of a size, a disposition position, and a disposition angle of the partial region, it is possible to detect various face regions present in the image data.

In the color detection process, a process of storing color information of a subject region designated according to a subject designation method to be described below as a feature color is performed. The color detection process is performed when a detection target subject is an object ("object" other than a person). For example, an RGB signal or a luminance signal (Y signal) which are output signals from the image processing circuit 107 and a color difference (R-Y or B-Y) signal are used as the color information. When a subject is detected, the subject detection unit 123 divides image data into a plurality of partial regions and calculates an average value of luminance and color differences for each partial region. The subject detection unit 123 compares feature color information stored in advance to color information of each region at the time of the detection of the subject and sets a partial region in which a difference between the luminance and the color difference is equal to or less than a predetermined amount as a candidate for a subject region. A process of setting a group of partial regions mutually adjacent in the candidate of the subject region as a same-color region and setting a region in which the same-color region is within a predetermined size range as a final subject region is performed.

The subject detection unit 123 calculates the size of the subject region in the image data using subject distance information measured by the CZ control unit 119 and focal distance information of the zoom lens 102. A posture detection unit 124 detects a posture (for example, normal position/grip-up/grip-down) of the digital camera 100 based on information of an acceleration sensor. A shake detection unit 125 detects a deflection state of the digital camera 100 based on angular velocity information or the like by a gyro sensor by determination. The shake detection unit 125 determines that the camera is handheld when a deflection amount (detected value) applied to the gyro sensor or the like is equal to or greater than a predetermined amount (threshold value), and determines that the camera is fixed on a tripod or the like when the deflection amount is less than the predetermined amount. Sensors of a detection unit that acquires control information of the vibration-proof lens driving unit 111 may also be configured to be used as the acceleration sensor and the gyro sensor used to detect the posture and detect the shake.

Next, an overview of the automatic zoom function and the AZ control unit 122 according to the embodiment will be described. In a camera not equipped with the automatic zoom function, the following manipulation is necessary, for example, when a subject moves and falls outside of the frame while the photographer performs framing in a telescopic state and waits to take a picture.

First, the photographer performs a zoom-out operation by manipulating the zoom manipulation member, and then searches for a subject. After the photographer searches for the subject, the photographer performs a zoom manipulation again to adjust an angle of view until the angle of the view becomes a desired angle of view. For example, when the size of a subject image changes due to movement of the subject, the photographer necessarily manipulates the zoom manipulation member to adjust the size of the subject image.

Conversely, in a camera equipped with the automatic zoom function, the photographer performs a manipulation of designating a subject on a touch panel or the like to designate a subject desired to be photographed after setting the automatic zoom function. When the automatic zoom function is set, a zoom operation is automatically performed so that the designated subject has a predetermined size near the center of an image. As the method of designating a subject, in addition to the touch panel manipulation, for example, there is a method of designating a subject near the center of a screen when the photographer manipulates a specific button or a method of automatically selecting a main subject among subjects detected by a camera.

The subject detection unit 123 calculates the position or size of a subject region designated from the image memory 108 in image data. A motion of a subject can be tracked by performing this process on sampled image data continuously whenever an image is displayed as a live view. The AZ control unit 122 starts the zoom-out operation when an image of a subject being tracked is detected in a zoom-out region to be described below or when an image of the detected subject becomes greater than a predetermined size. That is, the AZ control unit 122 instructs the CZ control unit 119 or the electronic zoom control unit 120 to perform zoom-out in a wide angle direction. When the subject is detected in a zoom-in region and the subject image fits within a range of a predetermined size, a zoom-in operation is performed to the telephoto side. Through such a process, the photographer may operate the camera without worrying about the zoom operation so that an image of a desired subject fits in a screen. Even when the subject falls outside of the frame, a zoom magnification is automatically changed. Therefore, it is possible to perform alignment of an angle of view more simply.

Figure 4:
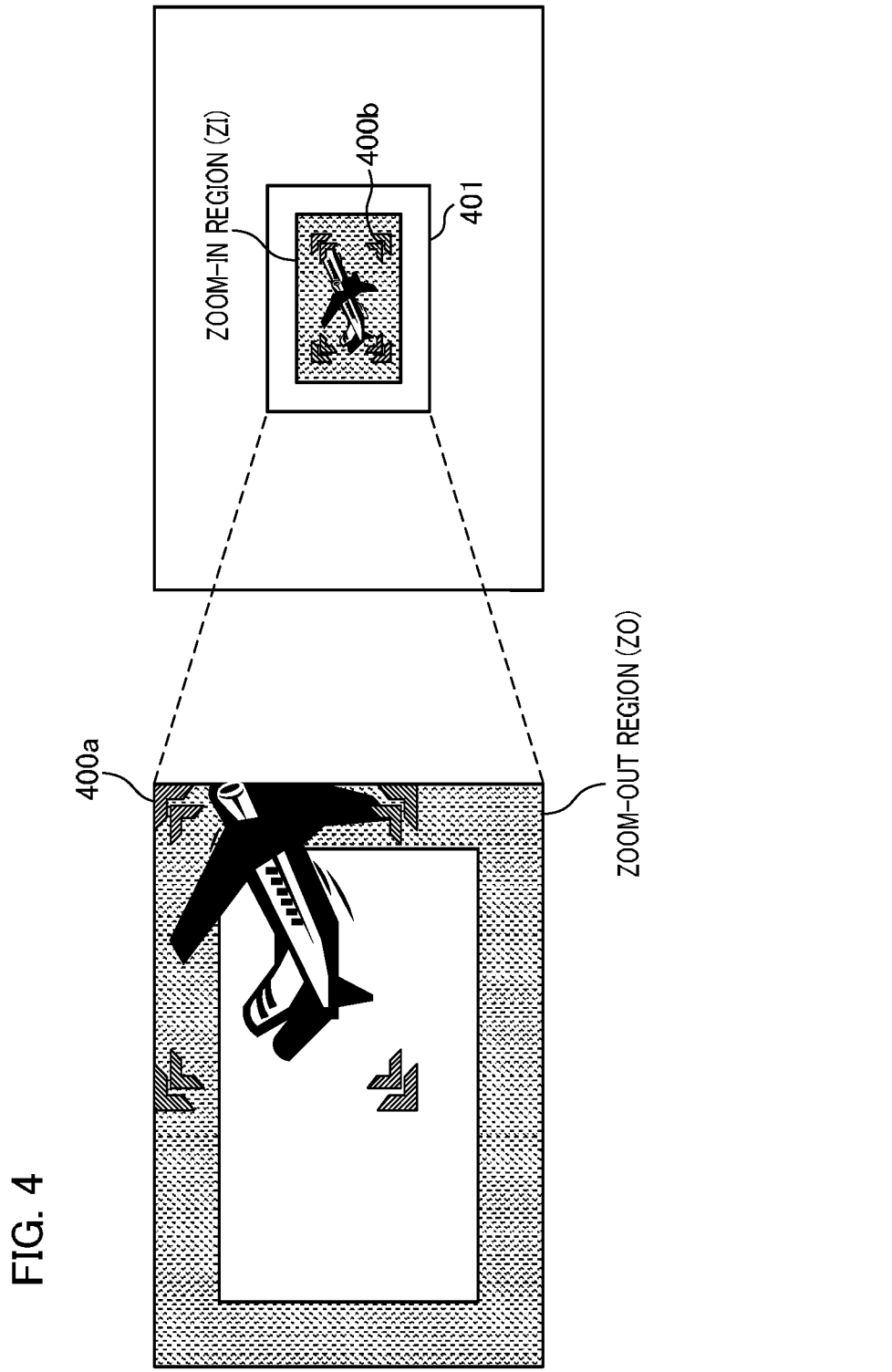
FIG. 4 is an explanatory diagram illustrating a process of preventing a subject (object) from falling outside of a screen.
Figure 5A:
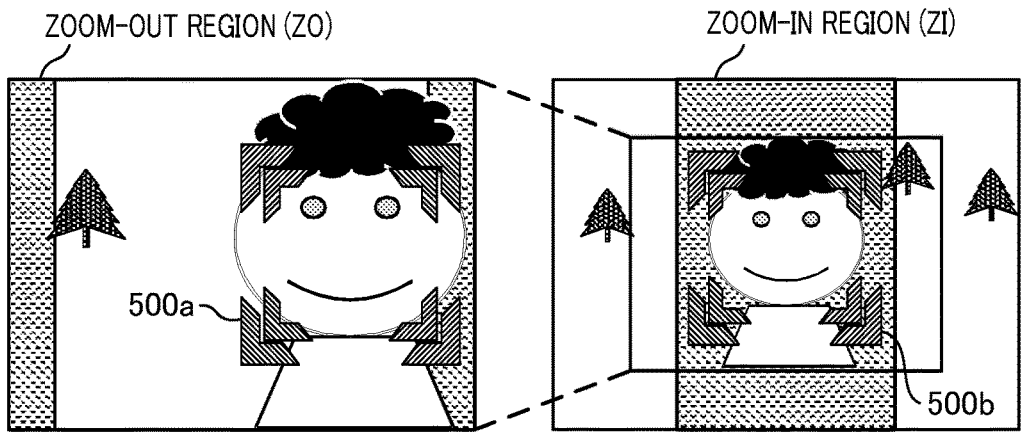
FIGS. 5A to 5C are explanatory diagrams illustrating a process of preventing a subject (person) from falling outside of a screen.
Figure 5B:
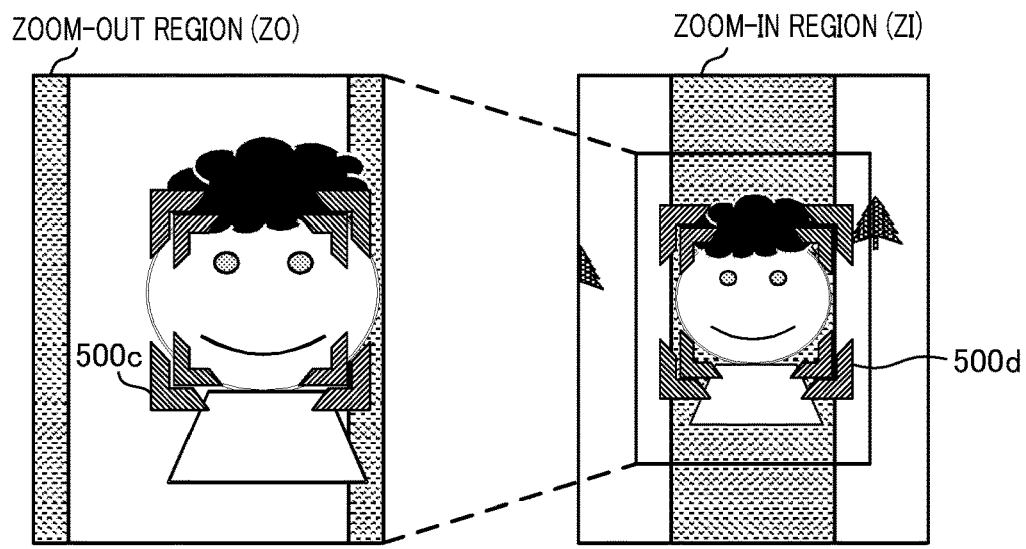
Figure 5C:
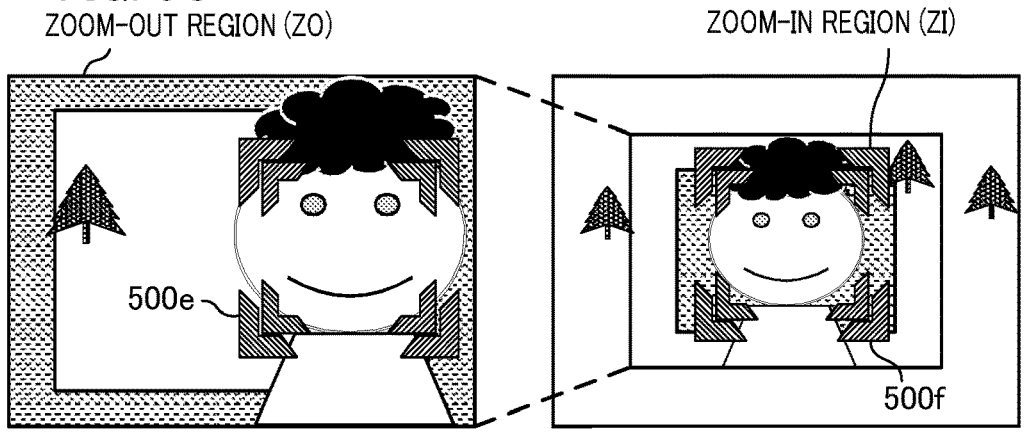

Next, start conditions of a zoom-out operation or a zoom-in operation will be described with reference to FIGS. 4 to 6F. FIG. 4 is explanatory diagrams illustrating a process of preventing a subject (object) from falling outside of a screen. FIGS. 5A to 5C are explanatory diagrams illustrating a process of preventing a subject (person) from falling outside of a screen.

In FIGS. 4 and 5A to 5C, frames 400a and 400b are first tracking frames (hereinafter referred to as object tracking frames) for tracking a subject (object) and frames 500a to 500f are second tracking frames (hereinafter referred to as face tracking frames) for tracking a subject (the face of a person). Hereinafter, for descriptions that could apply to a person or an object, the object tracking frame and the face tracking frames are collectively referred to as a subject tracking frame in some cases. The subject tracking frame is displayed to surround a subject image on an electronic viewfinder screen (EVF screen) of the display unit 109 so that the photographer can see a designated subject. The position and size of the subject tracking frame on the screen is calculated based on the face information and the color information by the subject detection unit 123 and is updated at a frame rate period.

A process of preventing a subject (airplane) from falling outside of a screen will be described with reference to FIG. 4. A zoom-out region ZO (hereinafter referred to as a ZO region) in a left figure of FIG. 4 indicates a region more outside than a predetermined ratio in the entire angle of view (entire screen) displayed by the EVF. For example, the central point of the screen is 0% and the entire screen is 100%, and a case in which a position located at 80% of the entire screen is set as a boundary of the ZO region is assumed. In this case, a region of 80% to 100% of the entire screen is the ZO region. When apart of the object tracking frame 400a enters the ZO region, the AZ control unit 122 performs control such that a zoom-out operation starts. The AZ control unit 122 stores a zoom magnification (corresponding to a zoom-in angle of view) before zoom movement in the memory 118. A target zoom magnification or a zoom speed during a zoom-out operation are set in advance according to the size of a subject image or a movement speed. The target zoom magnification or the zoom speed may be appropriately calculated according to the size of a subject image or the movement speed. The zoom-out operation is performed according to the target zoom magnification or the zoom speed. In this way, it is possible to efficiently prevent a subject from falling outside of the frame.

A right figure of FIG. 4 illustrates an angle of view when a zoom-out operation corresponding to a predetermined zoom change amount is performed from the angle of view in the left figure of FIG. 4. A zoom-in region ZI (hereinafter referred to as a ZI region) illustrated in right figure of FIG. 4 indicates a region more inside than a predetermined ratio at a zoom-in angle of view (an angle of view before zoom-out) 401 in a subject search state. For example, the central point of the screen is 0% and the zoom-in angle of view 401 is 100%, and a case in which a position located at 70% of the zoom-in angle of view 401 is set as a boundary of the ZI region is assumed. In this case, a region of 0% to 70% of the entire zoom-in angle of view 401 is the ZI region. At this time, for example, when a zoom-out magnification is ½, the zoom-in angle of view 401 has a size of 50% of the entire screen. Accordingly, the boundary of the ZI region is 70%×(½)=35% of the entire screen. The ZI region can also be said to be a region of 0% to 35% of the entire screen. When the photographer changes a direction of the camera so that the object tracking frame 400b fits in the ZI region, the AZ control unit 122 performs control such that a zoom-in operation starts.

Next, a process of preventing a subject (person) from falling outside of a screen will be described with reference to FIGS. 5A to 5C. When a subject is a person and a part of the face tracking frame enters the ZO region, a zoom-out operation starts. When the face tracking frame fits in the ZI region, a zoom-in operation is performed. The case in which a subject is a person is different from the case in which a subject is an object. Thus, since a movement direction of the subject can be predicted to some extent, the ZO region and the ZI region are set according to a region in the predicted movement direction. In photographing in the handheld state, a subject may fall outside of the frame due to an influence of camera shake or the like. However, when the subject falls outside of the frame due to camera shake or the like, the photographer can include the subject in the frame again by performing an operation of including the subject in the frame. Here, when a ZO region is set in an upper portion of the screen and a person is disposed near the center to perform photographing, the face tracking frame enters the ZO region and the subject may fall outside of the frame unintentionally. Accordingly, when a subject is a person in the handheld state (a state in which the photographer holds the camera), no ZO region is set in an upper portion of the screen in consideration of a framing operation of the photographer.

In this way, in the embodiment, when the subject detection unit 123 detects a face, the AZ control unit 122 changes the ZO region and the ZI region according to a posture of the camera or a shake state. The posture of the camera is detected by the posture detection unit 124 and the shake state is determined from a detection result obtained by the shake detection unit 125. The detection result obtained by the shake detection unit 125 refers to a detection result indicating whether the camera is in the handheld state. Hereinafter, this will be described specifically with reference to FIGS. 5A to 5C.

FIG. 5A illustrates a ZO region and a ZI region set when the photographer holds the camera and poses at a normal position. In such a photographing scene, when a subject moves in a horizontal direction and falls outside of the frame, the position of the subject in a screen moves in the horizontal direction (longitudinal direction) of the screen at the normal position. Thus, both of the ZO region and the ZI region are arranged in a vertical belt-like shape in the vertical direction (transverse direction) with respect to the screen at the normal position. The ZO region is set in the vertical belt-like shape located on both end sides in the horizontal direction in a horizontally long rectangular screen. The ZI region is set in the vertical belt-like shape located in the central portion of the screen. In this case, when the face tracking frame 500a enters the ZO region, the AZ control unit 122 determines that zoom-out starts and performs control of the zoom-out operation corresponding to a predetermined zoom magnification. When the face tracking frame 500b is included in the ZI region, the AZ control unit 122 determines that zoom-in starts and performs control of the zoom-in operation corresponding to a predetermined zoom magnification up to a zoom return position. By setting the ZO region and the ZI region in this way, it is possible to efficiently prevent the subject (person) from falling outside of the frame.

FIG. 5B illustrates the ZO region and the ZI region set when the posture of the camera is changed in the same photographing scene and the photographer poses the camera in a vertical position state of grip-down or grip-up. In this case, the ZO region and the ZI region are arranged in vertical belt-like shapes in the vertical direction (longitudinal direction) of a screen at a vertical position. That is, the ZO region is set in the vertical belt-like shape located on both end sides in the horizontal direction in a vertically long rectangular screen. The ZI region is set in the vertical belt-like shape located in the central portion of the screen. In this case, when the face tracking frame 500c enters the ZO region, the AZ control unit 122 determines that zoom-out starts and performs control of the zoom-out operation corresponding to a predetermined zoom magnification. When the face tracking frame 500d is included in the ZI region, the AZ control unit 122 determines that zoom-in starts and performs control of the zoom-in operation corresponding to a predetermined zoom magnification up to a zoom return position. By setting the ZO region and the ZI region in this way, it is possible to detect the motion of the subject in the horizontal direction and efficiently prevent the subject (person) from falling outside of the frame.

FIG. 5C illustrates the ZO region and the ZI region set when a detection state of the shake detection unit 125 is a fixed state. The fixed state refers to a state in which the camera is fixed on a tripod or the like, and there is no possibility of a subject falling outside of the frame due to camera shake. When a zoom-in operation is performed while a subject is not framed near the center of a screen, there is a possibility of the subject falling outside of the frame due to the zoom-in operation. Accordingly, the ZO region is set in the entire periphery portion of the screen and the ZI region is set further inside than a zoom-in angle of view. That is, the ZO region is set in a rectangular belt-like shape located on the corner sides in the vertical and horizontal directions of the screen. The ZI region is set in a rectangular shape located in the center of the screen. In this case, when a face tracking frame 500e enters the ZO region, the AZ control unit 122 determines that zoom-out starts and performs control of the zoom-output operation corresponding to a predetermined zoom magnification. When a face tracking frame 500f is included in the ZI region, the AZ control unit 122 determines that zoom-in starts and performs control of the zoom-in operation corresponding to a predetermined zoom magnification up to a zoom return position.

In the embodiment, as described above, the range of each of the ZO region and the ZI region is dynamically changed according to a change in the posture of the camera or the photographing state (handheld state/fixed state). In this way, it is possible to efficiently prevent a subject from falling outside of a frame while preventing an erroneous operation due to camera shake or the like. Further, the ZO region or the ZI region may be changed according to one of the posture of the camera and the photographing state (handheld state/fixed state) or only one of the ZO region and the ZI region may be changed.

Next, a zoom operation of maintaining a ratio of a subject image to a screen within a predetermined range will be described. In the embodiment, control (size maintenance control) is performed so that the size of the subject image is maintained within the predetermined range from a reference size by automatically performing a zoom operation when the size of the detected subject image exceeds a predetermined multiple of the reference size. FIGS. 6A and 6B are diagrams for describing a process of maintaining the size of a subject (person) image in a screen. FIGS. 7A to 7E are explanatory diagrams of composition setting of a subject (person).

Figure 7A:
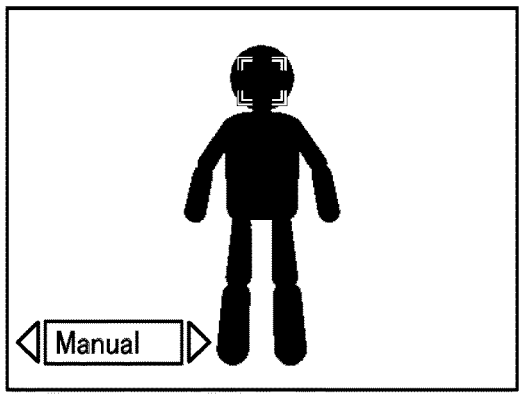
FIGS. 7A to 7E are diagrams for describing composition setting when a subject is a person.
Figure 7B:
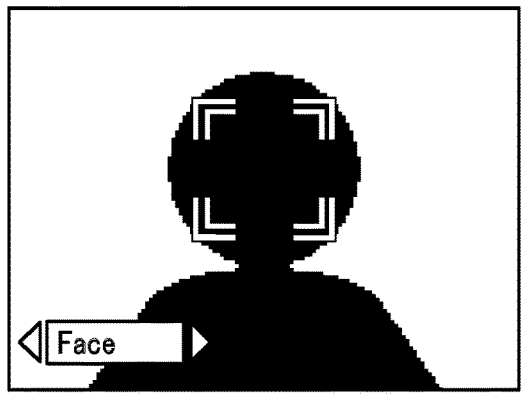
Figure 7C:
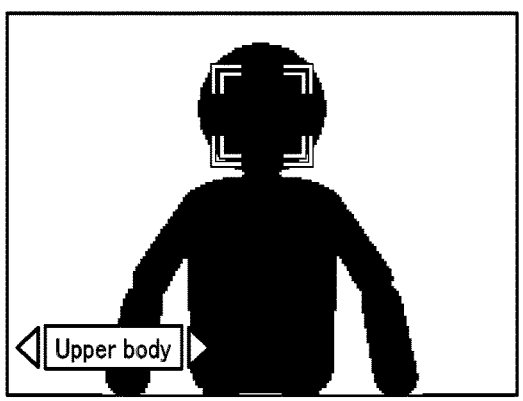
Figure 7D:
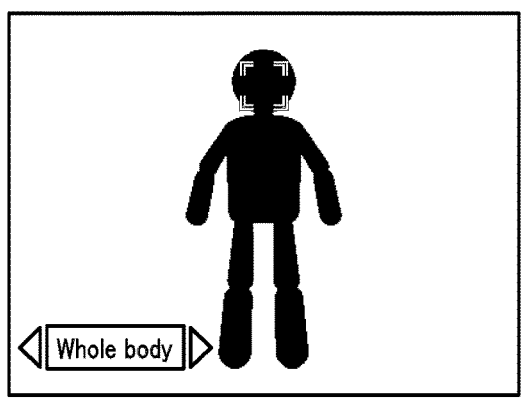

First, setting of a range (composition) in which a tracking target subject fits in a screen will be described with reference to FIGS. 7A to 7E. FIG. 7A exemplifies screen display when composition setting is setting of "manual." In the "manual" setting, the photographer changes the size of a face tracked when the photographer performs a manual zoom operation through a zoom lever manipulation while viewing an image of a person on a screen. The size of the subject image at that time is stored as a reference size in the memory 118. FIG. 7B exemplifies screen display when the composition setting is setting of "face." In the composition setting of "face," a size with which a face fits in the screen in accordance with a posture of the camera or a direction of the face is calculated as a reference size and is stored in the memory 118. Similarly, FIG. 7C exemplifies screen display when the composition setting is setting of "upper body" and FIG. 7D exemplifies screen display when the composition setting is setting of "whole body." A reference size is calculated so that the reference size is a size set on each screen and is stored in the memory 118.

Figure 7E:
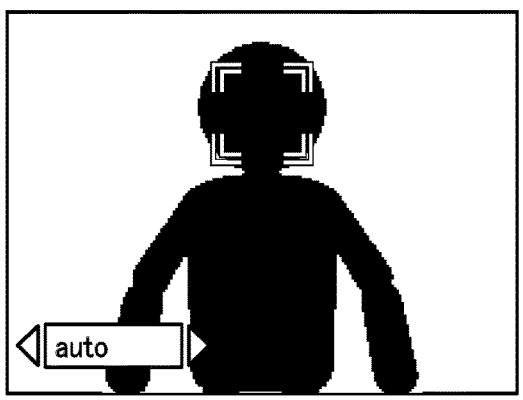

FIG. 7E exemplifies screen display when the composition setting is setting of "auto." In the "auto" setting, the AZ control unit 122 determines an appropriate composition based on a subject position, a subject size, the number of subjects, a posture of the camera, or the like in the screen. The reference size is calculated so that the determined composition is realized and is stored in the memory 118. A method of calculating the reference size will be described below with reference to FIG. 15.

The photographer can perform a manipulation of changing the composition setting by manipulating left and right buttons of the manipulation unit 117 on a photographing screen or performing selection on a setting menu. When the photographer performs the manipulation of changing the composition setting, the AZ control unit 122 updates information regarding the composition setting stored in the memory 118. FIGS. 7A to 7E illustrate the composition setting examples of "manual," "face," "upper body," and "auto" when the subject is a person, but the setting of the composition is not limited thereto. Only some of the five exemplified compositions may be set or other compositions may be included. When a subject is an object, for example, compositions of "manual," "large," "medium," "small," and "auto" may be set.

A case in which the composition setting is "manual" will be described as an example with reference to FIGS. 6A and 6B in the zoom operation of maintaining the ratio of the subject image to the screen within the predetermined range. FIG. 6A exemplifies a zoom operation performed automatically by the camera when a subject (person) approaches the camera. This is a zoom-out operation of fitting the ratio of the subject image to the screen within the predetermined ratio. In FIGS. 6A and 6B, face tracking frames 600a to 600f are displayed to surround a face region as a feature region of the person who is the subject. Accordingly, the size of the face tracking frame will be described as a subject size herein.

A left figure of FIG. 6A shows an angle of view when a subject is designated according to a subject designation method to be described below. The size of the face tracking frame 600a at the time of the designation of the subject is stored as a reference subject size (reference size) in the memory 118. A center figure of FIG. 6A shows an angle of view when the subject approaches the camera when the zoom magnification is not changed from the state in the left figure of FIG. 6A. For example, a size which is 150% of the size of the face tracking frame 600a which is the reference subject size is set as a start size of the zoom-out operation. When a relation between the subject tracking frames (face tracking frames) is "face tracking frame 600b>face tracking frame 600a×150%," that is, the tracking frame is changed with respect to the reference size more than a predetermined change amount, the AZ control unit 122 determines that the zoom-out operation starts.

A right figure of FIG. 6A shows an angle of view zoomed out from the angle of view 601 in the center figure of FIG. 6A by a predetermined zoom magnification and the face tracking frame 600c. Here, the predetermined zoom magnification is set to 1/1.5 times in consideration of a change ratio (150%) of the size of the face tracking frame at the time of the start of the zoom-out operation with respect to the reference subject size. Thereafter, when the subject further approaches the camera, the zoom-out to the wide angle side is further performed so that the subject image can continuously fit within the predetermined ratio. Accordingly, the photographer can concentrate on manipulating the release switch.

In contrast, FIG. 6B exemplifies a zoom operation performed automatically by the camera when the person who is a subject moves away from the camera. This is a zoom-in operation of fitting a ratio of the subject image to the screen within a predetermined range. A left figure of FIG. 6B shows an angle of view when a subject is designated according to a subject designation method to be described below. The size of the face tracking frame 600d at the time of the designation of the subject is stored as a reference subject size in the memory 118 (when the composition setting is "manual").

A center figure of FIG. 6B illustrates an angle of view when the subject moves away from the camera when the zoom magnification is not changed from the state of the left figure of FIG. 6B. For example, a size which is 50% of the size of the face tracking frame 600d which is the reference subject size is set as a start size of the zoom-in operation. When a relation between the face tracking frames is "face tracking frame 600e>face tracking frame 600d×50%," the tracking frame is determined to be changed with respect to the reference size more than a predetermined change amount. When the determination condition is satisfied and the face tracking frame 600e is included in the ZI region, the AZ control unit 122 determines that the zoom-in operation starts. Here, the ZI region is set further inside than an angle of view 502 zoomed in by a predetermined zoom magnification with respect to the angle of view of the center figure of FIG. 6B.

A right figure of FIG. 6B shows an angle of view (corresponding to the angle of view 602) zoomed in from the angle of view in the center figure of FIG. 6B by the predetermined zoom magnification and the face tracking frame 600f. Here, the predetermined zoom magnification is set to 1/0.5 in consideration of a change ratio (50%) of the size of the face tracking frame at the time of the start of the zoom-in operation with respect to the reference subject size.

The processes of preventing a subject from falling outside of a frame have been described when the subject is an object in FIG. 4 and when the subject is a person in FIGS. 5A to 5C. The processes of fitting the ratio of the size of the subject image to the screen within the predetermined ranges have been described when the subject is a person in FIGS. 6A and 6B. Even when a tracking target subject is an object, zoom operation start determination may be performed to control maintenance of the size of the subject image illustrated in FIGS. 6A and 6B as in the case in which the subject is a person. When the composition setting is a setting other than "manual," a zoom operation is automatically performed according to each reference size as in FIGS. 6A and 6B.

Figure 8:
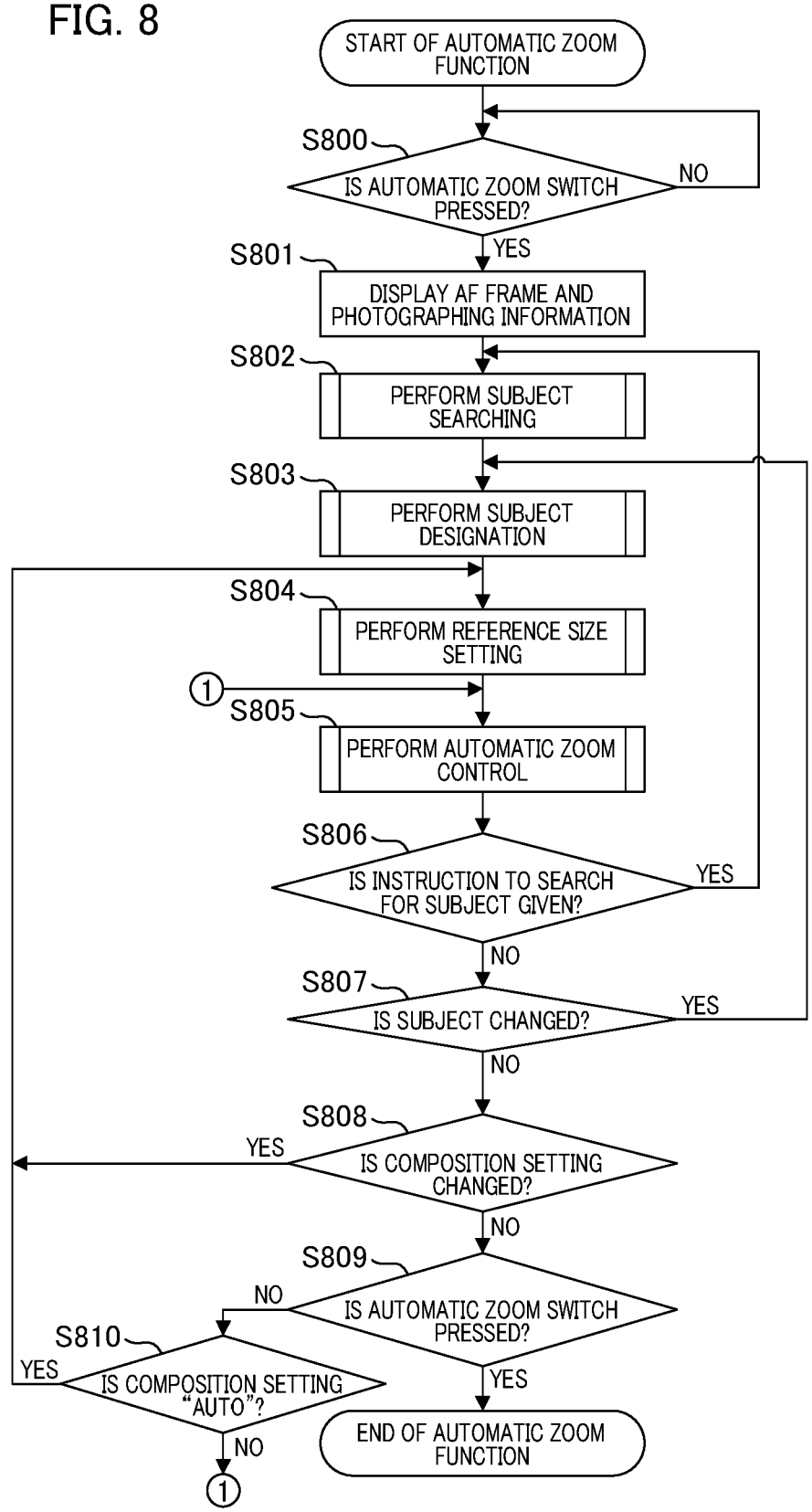
FIG. 8 is a flowchart for describing the flow of a process for an automatic zoom function.

Next, a process for the automatic zoom function will be described with reference to FIGS. 8 to 24. FIG. 8 is a flowchart illustrating an entire processing example of the automatic zoom function. Hereinafter, the automatic zoom function is assumed to be performed based on an instruction of the system control unit 114 (the AZ control unit 122) unless explicitly mentioned otherwise.

Figure 9:
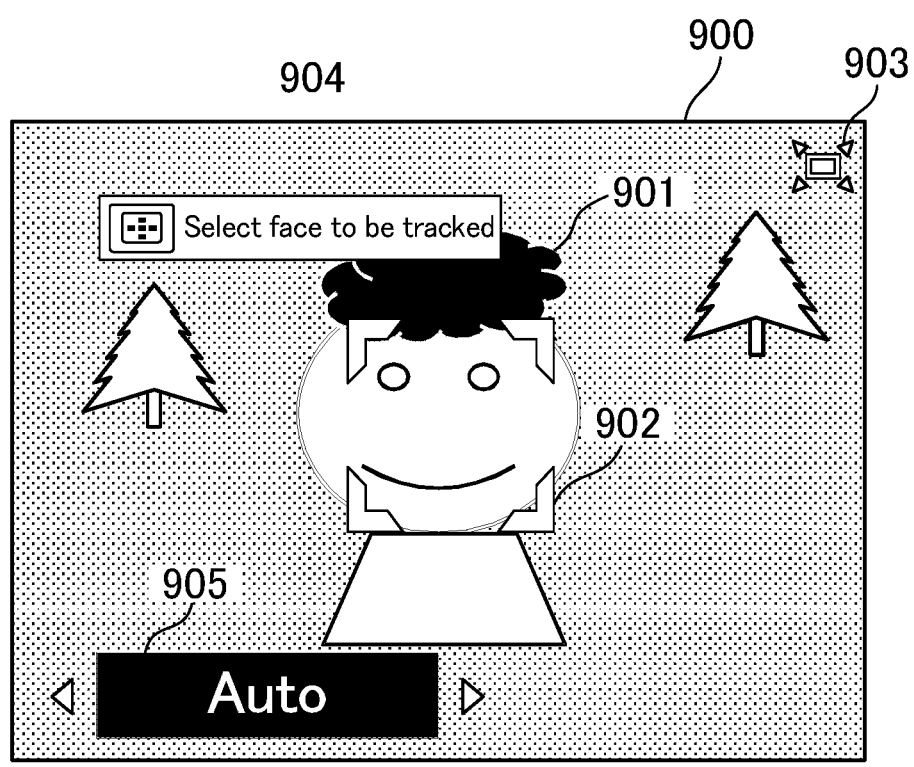
FIG. 9 is a diagram for describing a screen example in the automatic zoom function.
Figure 10:
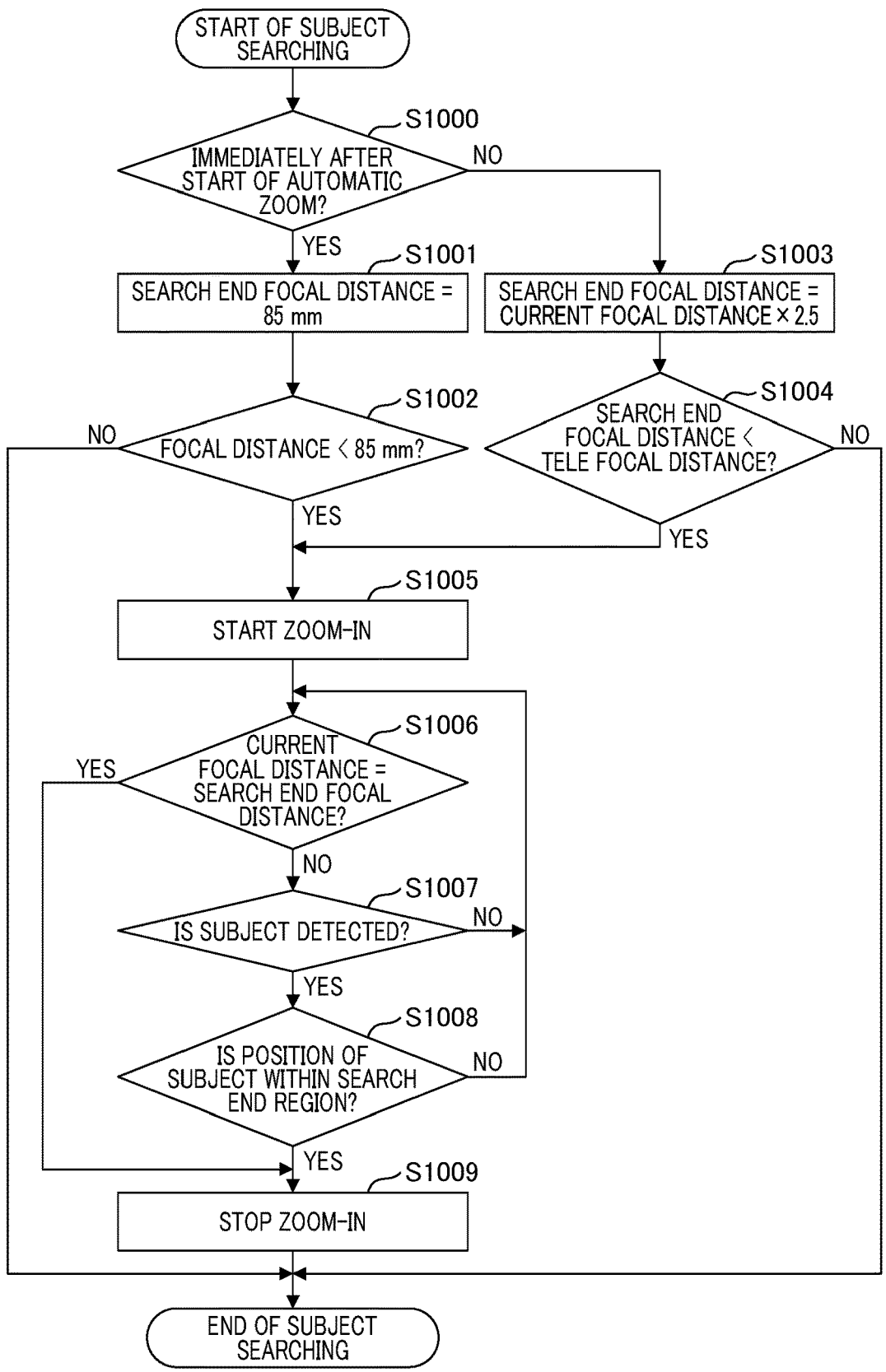
FIG. 10 is a flowchart for describing a subject searching process.

In S800, the AZ control unit 122 first determines a manipulation state of the automatic zoom manipulation switch of the manipulation unit 117. When the automatic zoom manipulation switch is pressed, the process proceeds to S801. When the automatic zoom manipulation switch is not pressed, the determination process of S800 is repeated. In S801, a process of causing the display unit 109 to display an auto-focus (AF) frame and photographing information is performed based on a subject detection result by the subject detection unit 123 of the system control unit 114. A screen example is illustrated in FIG. 9. When there is a detected subject 901 in a through image 900, a subject detection frame 902 is displayed. An automatic zoom function icon 903 is displayed to indicate transition to an automatic zoom function mode. Further, subject designation guidance 904 is displayed to indicate that subject designation to be described below is possible. Display content of the subject designation guidance 904 is not limited to the example of FIG. 9, but may be changed to content in conformity with a subject designation process to be described below. A composition setting value 905 is displayed to indicate a value of a composition setting to be described below. All of the display objects (see reference numerals 902 to 905) on the screen are displayed over the through image 900.

Immediately after the process of the automatic zoom function starts or when a subject search button of the manipulation unit 117 is pressed (yes in S806), the subject searching process of S802 is performed. The subject searching process performed in step S802 will be described with reference to FIG. 10. When a photographing target subject is far away from the camera, even though a subject image is in the screen, there is a possibility of the subject being undetectable by the subject detection unit 123 when a feature region of the subject is too small. In such a scene, the automatic zoom function based on subject information may not be performed. Accordingly, a subject searching process of performing a zoom-in operation while detecting a subject up to a predetermined focal distance is performed.

In S1000, a process of determining whether the subject search button is pressed immediately after start of automatic zoom or during the automatic zoom rather than immediately after the start of the automatic zoom is performed. In the case of the former positive determination result (yes) in S1000, the process proceeds to S1001. In the case of the negative determination result (no), the process proceeds to S1003. In S1001, a process of acquiring a subject search end focal distance is performed. The subject search end focal distance is a focal distance at an end zoom magnification when the searching of the subject image in the image ends. Hereinafter, the subject search end focal distance is referred to as a search end focal distance. In the embodiment, the search end focal distance is set to a focal distance of 85 mm by 35 mm size conversion immediately after the start of the automatic zoom. The focal distance is a focal distance of a standard lens generally considered to be appropriate when a person is photographed. Even when there is no subject (person) or a face is undetectable (for example, a person is facing backward), the subject detection can be set to a standby state at an appropriate angle of view after the end of the searching. Here, the focal distance is not limited to 85 mm. Another focal distance (for example, 50 mm or 100 mm) may be used. The photographer may change the search end focal distance from the menu setting or can change the search end focal distance according to a photographing mode, a subject to be photographed, or the like. When the process proceeds from S1001 to S1002, the focal distance at the time of mode start is compared to the search end focal distance and it is determined whether the focal distance is on a wide angle side or a telephoto side from the search end focal distance. When the focal distance at the time of the start of the automatic zoom is on the telephoto side from the search end focal distance (no in S1002), the subject searching process ends. Conversely, when the focal distance at the time of the start of the automatic zoom is on the wide angle side from the search end focal distance (yes in S1002), the process proceeds to S1005.

Conversely, when it is determined in S1000 that the subject is searched for through a manipulation of the subject search button, a process of acquiring the search end focal distance is performed in S1003. In the embodiment, the search end focal distance in the manipulation of the subject search button is assumed to be a focal distance on the telephoto side 2.5 times the focal distance when the manipulation is performed. Here, this magnification is merely an example, and another magnification may be used. The photographer may change the search end focal distance from the menu setting or can change the search end focal distance according to a photographing mode, a subject to be photographed, or the like. The process proceeds from S1003 to S1004, the search end focal distance acquired in S1003 is compared to the focal distance at a tele end (telephoto end), and it is determined whether the search end focal distance is on the wide angle side or the telephoto side from the focal distance at the tele end. When the search end focal distance is on the telephoto side from the focal distance at the tele end, the subject searching process ends. When the search end focal distance is on the wide angle side from the focal distance at the tele end, the process proceeds to S1005. In S1005, the AZ control unit 122 sets a zoom change amount corresponding to the search end focal distance acquired in S1001 or S1003 in the CZ control unit 119 or the electronic zoom control unit 120 and instructs to perform the zoom-in operation.

Next, in S1006, it is determined whether the current focal distance reaches the search end focal distance. When the current focal distance reaches the search end focal distance, the process proceeds to S1009. After the zoom-in operation stops, the subject searching process ends. Conversely, when it is determined in S1006 that the current focal distance does not reach the search end focal distance, the process proceeds to S1007. S1007 is a process of determining whether a subject is detected by the subject detection unit 123. When it is determined in S1007 that the subject is detected, the process proceeds to S1008. When it is determined that no subject is detected, the process returns to S1006. In S1008, it is determined whether a detection position of the subject is within a predetermined search end region of the screen. The predetermined search end region is assumed to be decided in accordance with a threshold value (position determination reference value) set in advance according to a subject. When the detection position of the subject detected in S1007 is within the predetermined search end region on the screen, the process proceeds to S1009, the zoom-in operation stops, and the subject searching process ends. Conversely, when it is determined in S1008 that the detection position of the subject is not within the predetermined search end region on the screen, the process returns to S1006 and the determination processes from S1006 to S1008 continue.

Figure 11B:
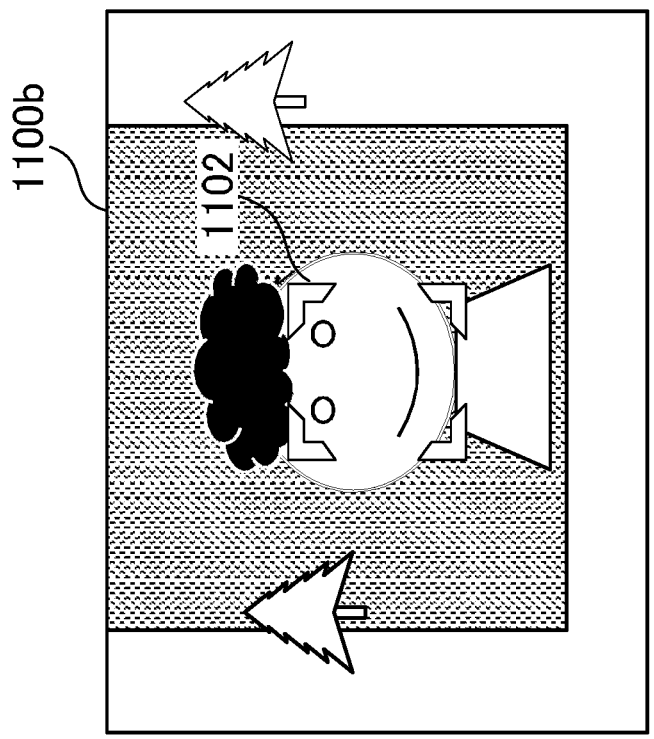
FIGS. 11A and 11B are diagrams for describing a search end region of the subject searching process.
Figure 11A:
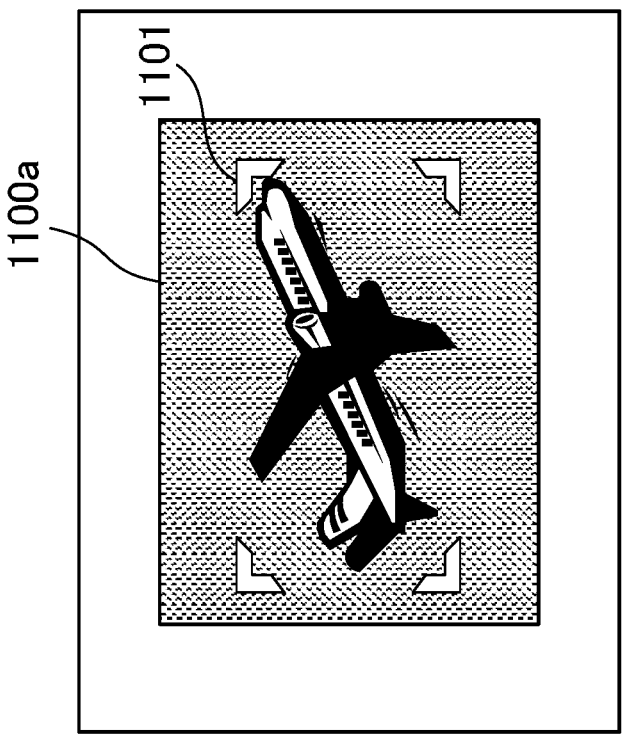

Here, the predetermined search end region described in S1008 will be described with reference to FIGS. 11A and 11B. When a specific subject (a person or an object) is photographed, the subject which is a photographing target is disposed near the center of the screen in some cases. When a subject which is not the photographing target is detected in the periphery of the screen and the subject searching process ends, there is a possibility of the subject searching process ending before the subject which is the photographing target is detected. In this case, the automatic zoom function may not be performed according to the photographer's intention. Accordingly, in the embodiment, only when a subject is detected in a central region of the screen and within a region near this region, is the search end region set as a region for determination so that the subject searching process ends. In FIG. 11A, a search end region 1100a set when the subject is an object (airplane) is exemplified. When the subject is an object, a range of a predetermined ratio, for example, 70%, from the center of the screen in any of upward, downward, right, and left directions on the screen is set as the search end region of the subject. In FIG. 11B, on the other hand, a search end region 1100b set when the subject is a person is exemplified. When the subject is a person, the search end region is set so that a range of 100% from the center of the screen in a region of an upper portion of the screen is included and a range of a predetermined ratio, for example, 70%, from the center of the screen in another direction (right, left or down) is included. When the subject is a person, there is a possibility of a face tracking frame 1102 of a subject which is a photographing target being disposed in the upper portion of the screen. For this reason, even when a subject is detected in the upper portion of the screen, the search end region is set so that the subject searching process ends.

Figure 12:
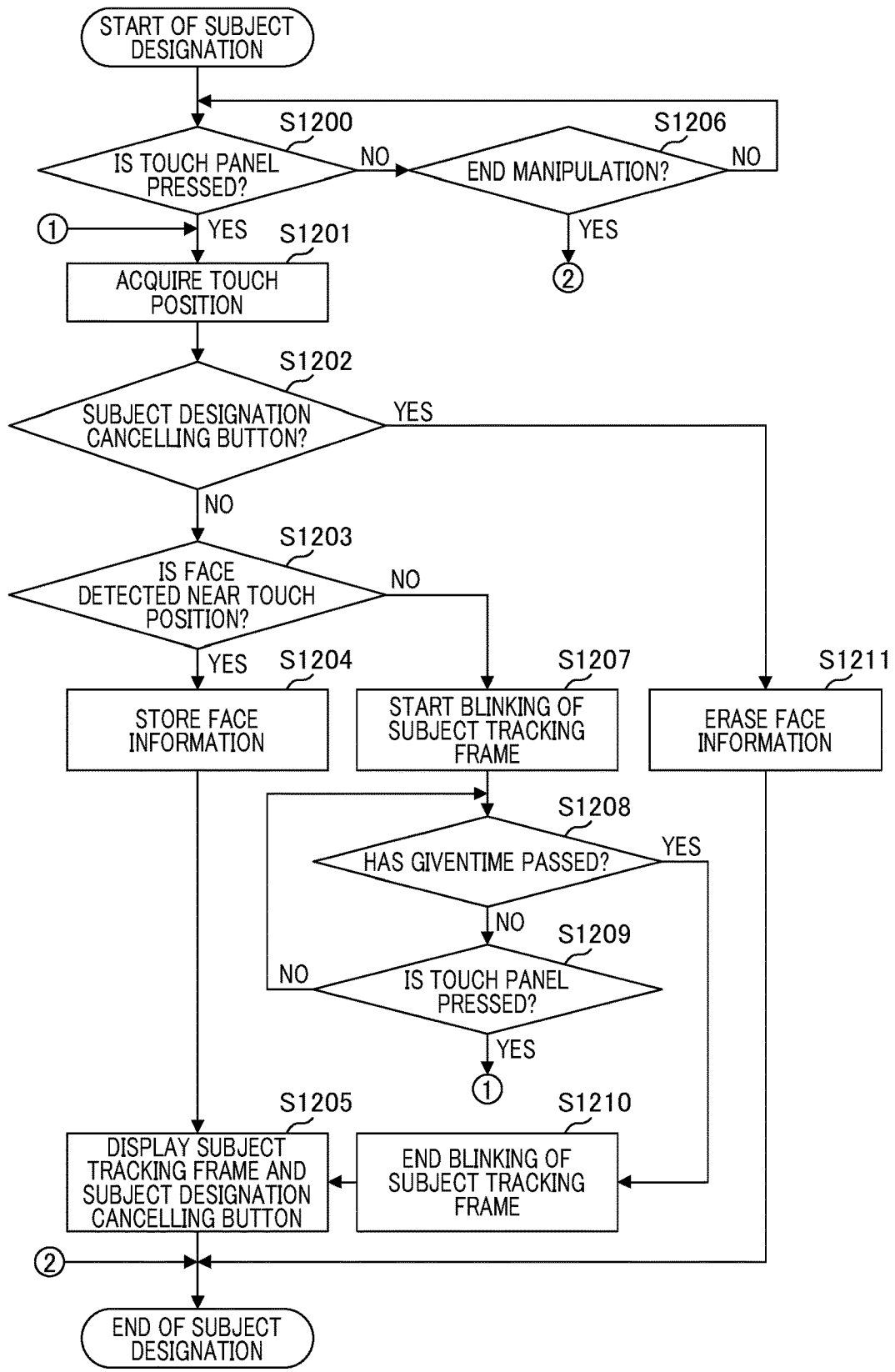
FIG. 12 is a flowchart for describing a subject designation process.
Figure 14A:
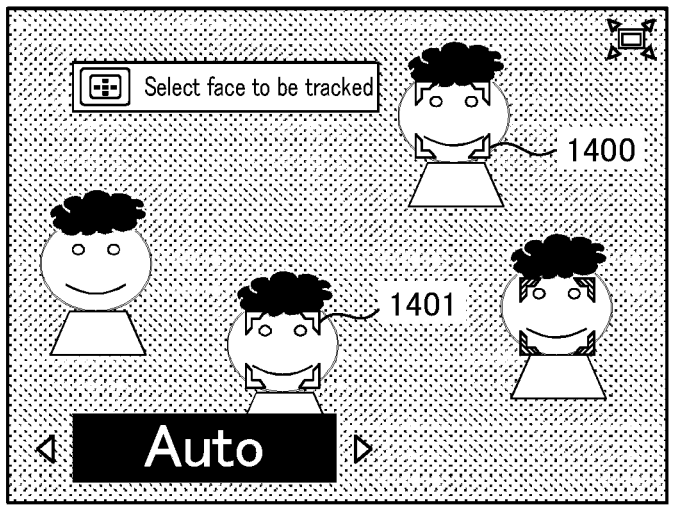
FIGS. 14A to 14C are diagrams illustrating screen examples in the subject designation process.

Next, the subject designation process indicated in step S803 in FIG. 8 will be described with reference to FIG. 12. FIG. 12 is a flowchart illustrating an example of a process in which a user designates a desired subject using the touch panel included in the manipulation unit 117. In this example, the user is assumed to perform a designating manipulation by touching a subject image displayed on the display unit 109. Here, the subject designation process will be described in detail using display screen examples of the display unit 109 with reference to FIGS. 14A to 14C. FIG. 14A illustrates a screen example when the subject designation process starts. This screen example is basically the same as the screen example of FIG. 9. In FIG. 14A, however, a plurality of people are detected by the subject detection unit 123. Both of frames 1400 and 1401 are the same as the subject detection frame 902 in FIG. 9, but the main subject detection frame 1400 is displayed on a subject determined to be a main face by the subject detection unit 123. A sub-subject detection frame 1401 is displayed on a subject determined to be a sub-face by the subject detection unit 123.

In S1200, the AZ control unit 122 determines whether the touch panel is pressed. When the touch panel is pressed, the process proceeds to S1201. When the touch panel is not pressed, an end manipulation of S1206 is determined. When the end manipulation of S1206 is determined, the subject designation ends. When the end manipulation is not determined, the process returns to S1200 to repeat the determination process. In S1201, the AZ control unit 122 acquires information regarding the position (touch position) touched by the user. Next, in S1202, the AZ control unit 122 determines whether the touch position is on a subject designation cancelling button. When the touch position is not on the subject designation cancelling button, the process proceeds to S1203. The subject designation cancelling button will be described below. When the touch position is on the subject designation cancelling button in S1202, the process proceeds to S1211 and the subject designation process ends after the face information is erased.

Figure 14B:
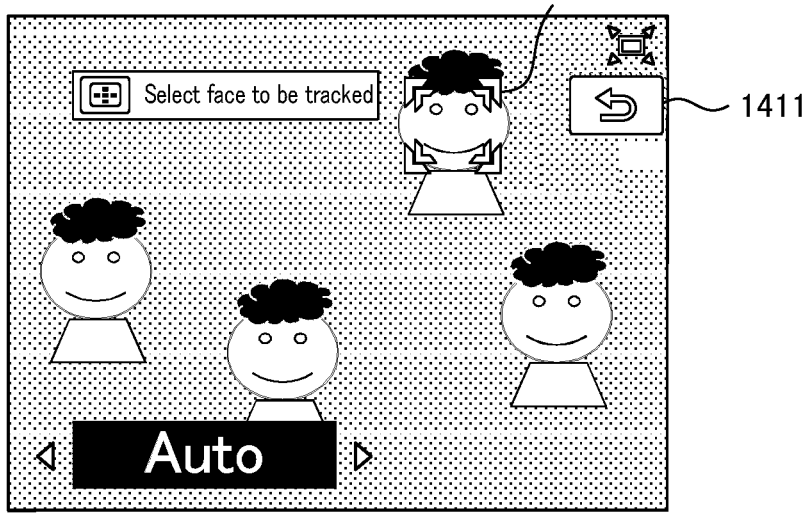

In S1203, the AZ control unit 122 notifies the subject detection unit 123 of the touch position and the subject detection unit 123 performs face detection near the touch position. When the face is detected near the touch position, a main subject is determined to be a person and the process proceeds to S1204. In S1204, the AZ control unit 122 stores the face information of the person who is an automatic tracking target in the memory 118. As specific face information, there is a size of the face, a detection position of the face, a direction of the face, or the like at the time of the subject designation. In a camera having a face authentication function, an authentication ID or the like is also stored. Then, the process proceeds to S1205 to display the subject tracking frame at the face position. The above-described subject designation cancelling button is also displayed. A screen example is illustrated in FIG. 14B. A subject tracking frame 1410 is displayed and a subject designation cancelling button 1411 indicating that the subject designation can be cancelled is displayed. Accordingly, the subject designation process ends.

Figure 14C:
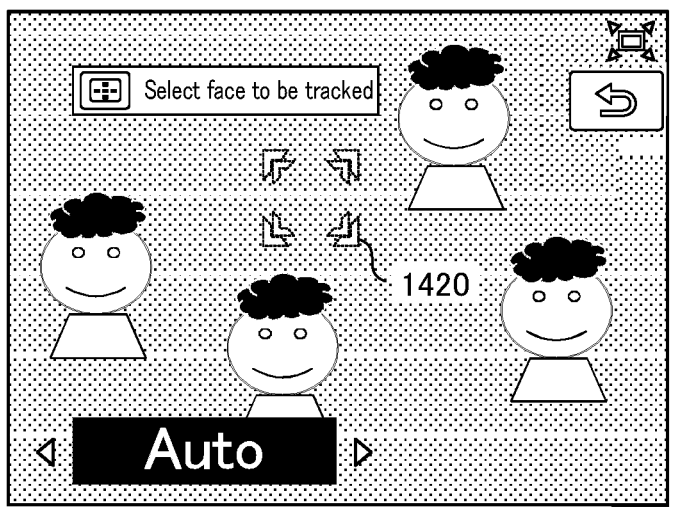

Conversely, when the face is not detected near the touch position in S1203, the main subject is determined to be an object other than a person and the process proceeds to S1207. In S1207, the AZ control unit 122 starts blinking of the subject tracking frame at a touched position in order to indicate that an object other than a face is not set as an automatic zoom target. In S1208, it is determined whether the blinking of the subject tracking frame is performed over a predetermined time. When the predetermined time has not passed, the process proceeds to S1209. In S1209, the AZ control unit 122 determines whether the touch panel is pressed. When the touch panel is pressed, the process proceeds to S1201. Conversely, when it is determined in S1208 that the predetermined time has passed, the process proceeds to S1210 to end the blinking of the subject tracking frame. A screen example is illustrated in FIG. 14C. When the user touches a spot in which there is no face, a subject tracking frame 1420 in a blinking state is displayed for a predetermined time. Here, the example in which an object other than a face is not tracked has been described, but an object other than a face may be set as an automatic tracking target. In this case, the process of blinking the subject tracking frame from S1207 to S1210 is not performed and a feature color near the touch position is stored as color information of the automatic tracking target in the memory 118 instead. As the specific color information, there is information regarding a feature color and its luminance, a chromatic value or a size of a same-color region, the central position of the same-color region, or the like at the time of the subject designation. In the following description, the face information and the color information are collectively referred to as subject information (including a subject size and a subject detection position).

The process proceeds from S1210 to S1205 and the subject tracking frame is displayed. In S1205, the AZ control unit 122 performs control such that the subject detection position is set as a center and a subject tracking frame (an object tracking frame or a face tracking frame) with a size corresponding to the subject size is displayed on the display unit 109. Thereafter, the subject designation process ends.

In this way, the subject detection unit 123 in the system control unit 114 detects a subject at a position designated on the display unit 109 by the photographer or near the designated position. Then, the AZ control unit 122 causes the display unit 109 to display the subject tracking frame. According to the example of the process of FIG. 12, the subject that the photographer desires to track can be designated simply according to an intuitive method. However, the subject designation method is not limited to this method. Another method will be described with reference to FIG. 13A.

Figure 13B:
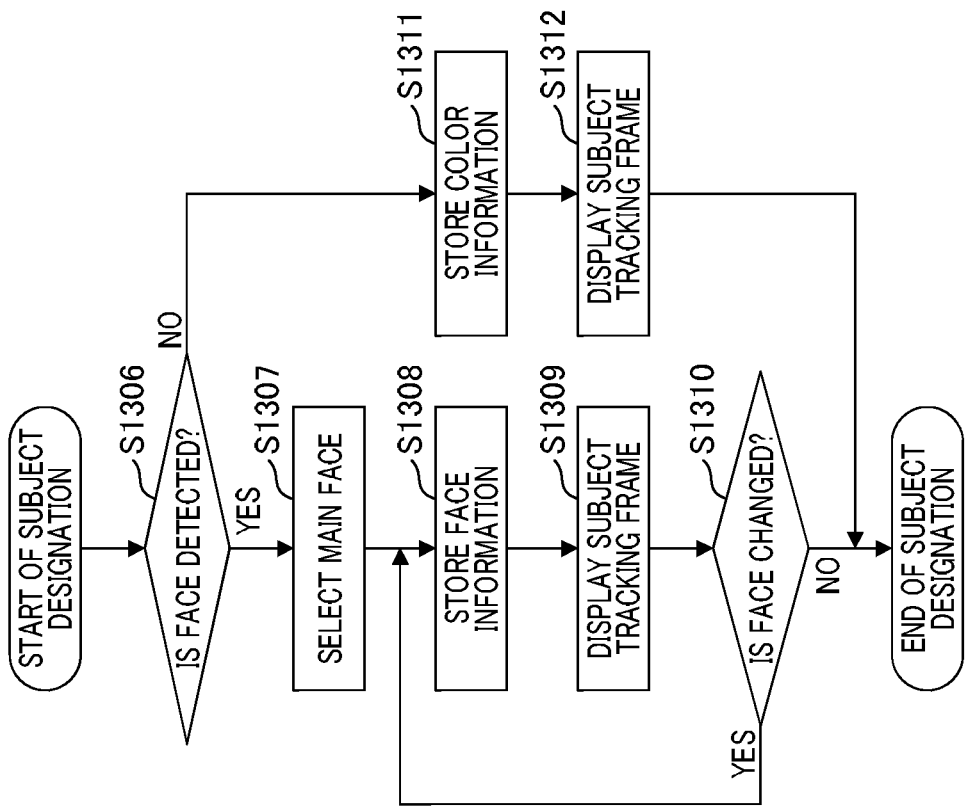
FIGS. 13A and 13B are flowcharts for describing another example of the subject designation process.
Figure 13A:
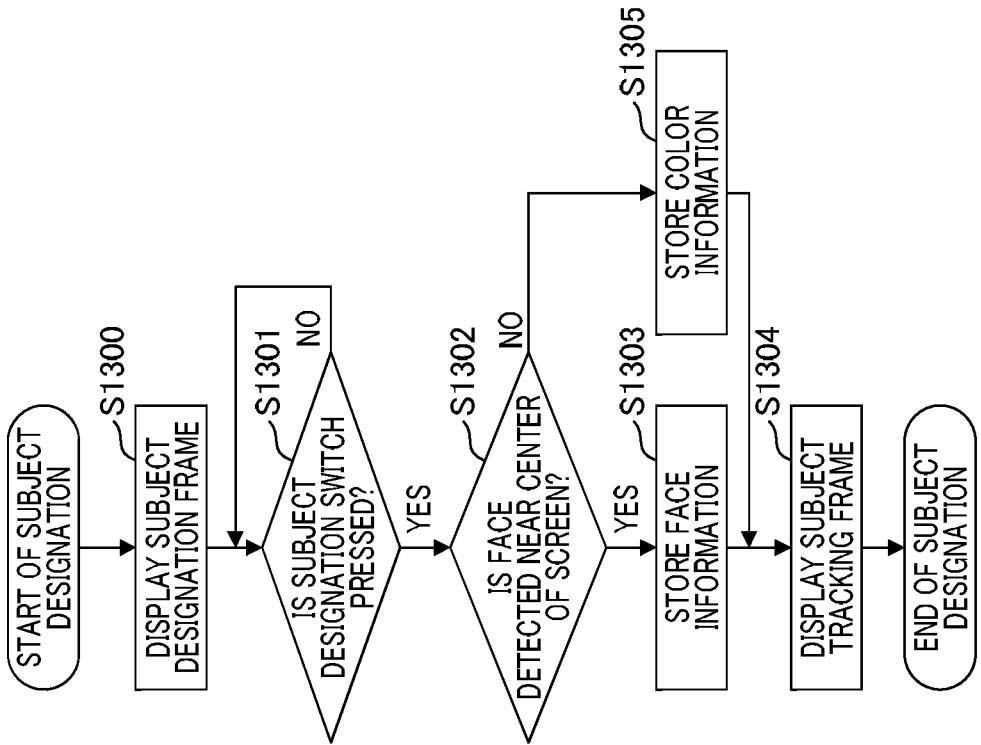

FIG. 13A is a flowchart illustrating an example of a process when the user designates a subject using a different switch (subject designation switch) from the automatic manipulation switch as a manipulation member included in the manipulation unit 117. In S1300, the AZ control unit 122 first displays a frame serving as a guide of the subject destination near the center of the screen of the display unit 109. The photographer adjusts the direction of the camera so that an image of a subject that he or she desires to track using the frame as the guide is fitted near the center of the screen. Next, in S1301, the AZ control unit 122 determines whether the subject designation switch is pressed. When the subject designation switch is pressed, the process proceeds to S1302. When the subject destination switch is not pressed, the determination process of S1301 is repeated in a standby state.

In S1302, the subject detection unit 123 performs the face detection near the center of the screen. When the face is detected near the center of the screen, a main subject is determined to be a person and the process proceeds to S1303. Conversely, when the face is not detected near the center of the screen, the main subject is determined to be an object other than a person and the process proceeds to step S1305. In S1303, when the subject detection unit 123 detects the face near the center of the screen, the main subject is determined to be a person and the subject information (face information) is stored in the memory 118. Thereafter, the process proceeds to S1304. Conversely, in S305, the subject detection unit 123 determines that the main subject is an object other than a person and the subject information (color information) is stored in the memory 118. Thereafter, the process proceeds to S1304. In S1304, the subject tracking frame (the object tracking frame or the face tracking frame) is displayed and the subject designation process ends.

In this way, in the processing example of FIG. 13A, the subject detection unit 123 detects the subject at the position of the center of the screen or near the position of the center of the screen of the display unit 109. The AZ control unit 122 causes the display unit 109 to display the subject tracking frame indicating the position of the subject. Even in a camera on which a manipulation member such as a touch panel is not mounted, the user can simply designate a subject.

FIG. 13B is a flowchart illustrating an example of a process of automatically selecting a subject to be tracked among faces detected when the automatic zoom manipulation switch included in the manipulation unit 117 is pressed. In S1306, the subject detection unit 123 first performs the face detection on the entire screen to determine whether the face of a person is detected. When the face of at least one person is detected on the entire screen, a main subject is determined to be a person and the process proceeds to step S1307. Conversely, when one face is not detected in the screen, the process proceeds to S1311.

In S1307, when the number of people whose faces are detected is one person, the subject detection unit 123 selects the face as a main face. When a plurality of faces are detected, the subject detection unit 123 selects a main face assumed as a subject to be tracked among the faces. As the determination standard for selecting the main face, for example, there is a method of preferentially selecting a face of which a face detection position is located closer to the vicinity of the center of the screen. When a plurality of faces are at substantially the same position, there is a method of selecting a face with a larger size as a main face. When a camera has a face authentication function, there is a method of preferentially setting a face registered for authentication as a main face when the face registered for authentication is present.

The process proceeds to S1307 to S1308. Then, after the AZ control unit 122 stores the face information regarding the main face in the memory 118, the process proceeds to S1309 and the face tracking frame is displayed on the screen. Next, in S1310, the face changing determination is performed. That is, when the plurality of faces are detected, the automatically selected main face is not necessarily the face intended by the photographer. For this reason, the photographer can change the main face. At this time, when the photographer presses a switch (the automatic zoom manipulation switch or the like) of the manipulation unit 117 and designates a desired face, a process of changing the main face to another face that was not selected as the main face among the faces for which the face tracking frame was detected is performed. When the main face is changed in S1310, the process returns to S1308 and the face information to be stored in the memory 118 is updated. In S1309, the face tracking frame is changed to the size and the detection position of the newly selected main face.

Conversely, the process proceeds from S1306 to S1311 when the main subject is determined to be an object other than a person. Then, the AZ control unit 122 performs control such that a feature color near the center of the screen is stored as color information of the automatic tracking target in the memory 118. Next, in S1312, the subject designation process ends after the object tracking frame is displayed on the screen.

In this way, in the processing example of FIG. 13B, the subject detection unit 123 in the system control unit 114 performs the face detection on the entire screen of the display unit 109. When a plurality of faces are detected, the AZ control unit 122 performs control such that the display unit 109 displays a subject tracking frame indicating the position of a first face as a main subject among the plurality of faces. When the subject is changed from the first face to a second face, the AZ control unit 122 performs control such that the display unit 109 displays a subject tracking frame indicating the position of the second face. The photographer can designate the desired subject simply with fewer manipulations.

In the subject designation process, both of the method of FIG. 12 and the method of FIG. 13A may be simultaneously applied when a camera includes both of the touch panel and the subject designation switch included in the manipulation unit 117. After the subject change is determined in S807 illustrated in FIG. 8, the subject can be designated with the method of FIG. 12 or 13A. After the subject searching process of S802, the subject can also be designated with the method of FIG. 13B. The subject designation process applied according to a flow of the process may be changed. When the subject designation process ends, the process proceeds to S804 of FIG. 8 to perform a process of setting the size of the tracked subject as a reference size.

Figure 15:
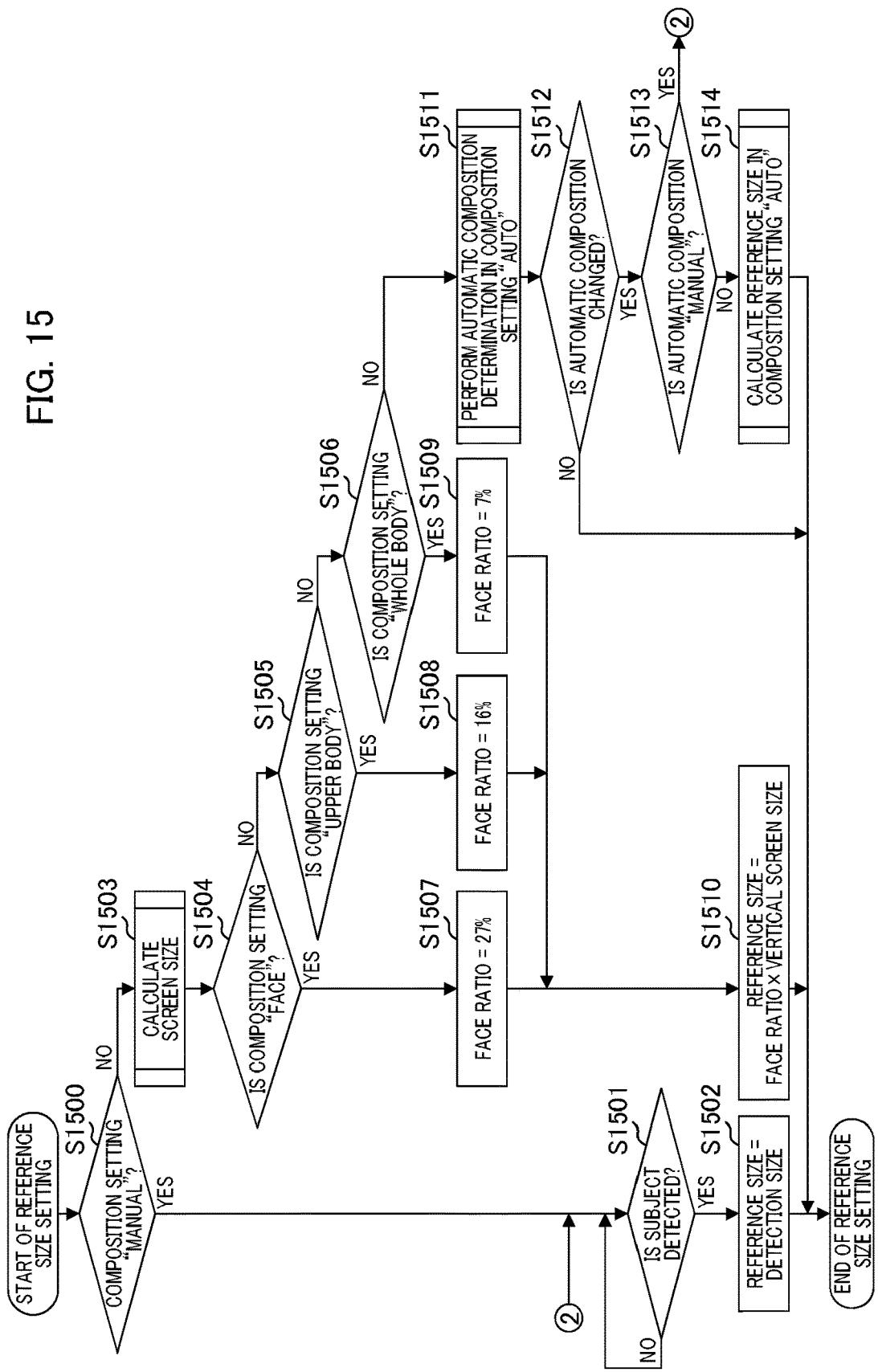
FIG. 15 is a flowchart for describing a reference size setting process.
Figure 16:
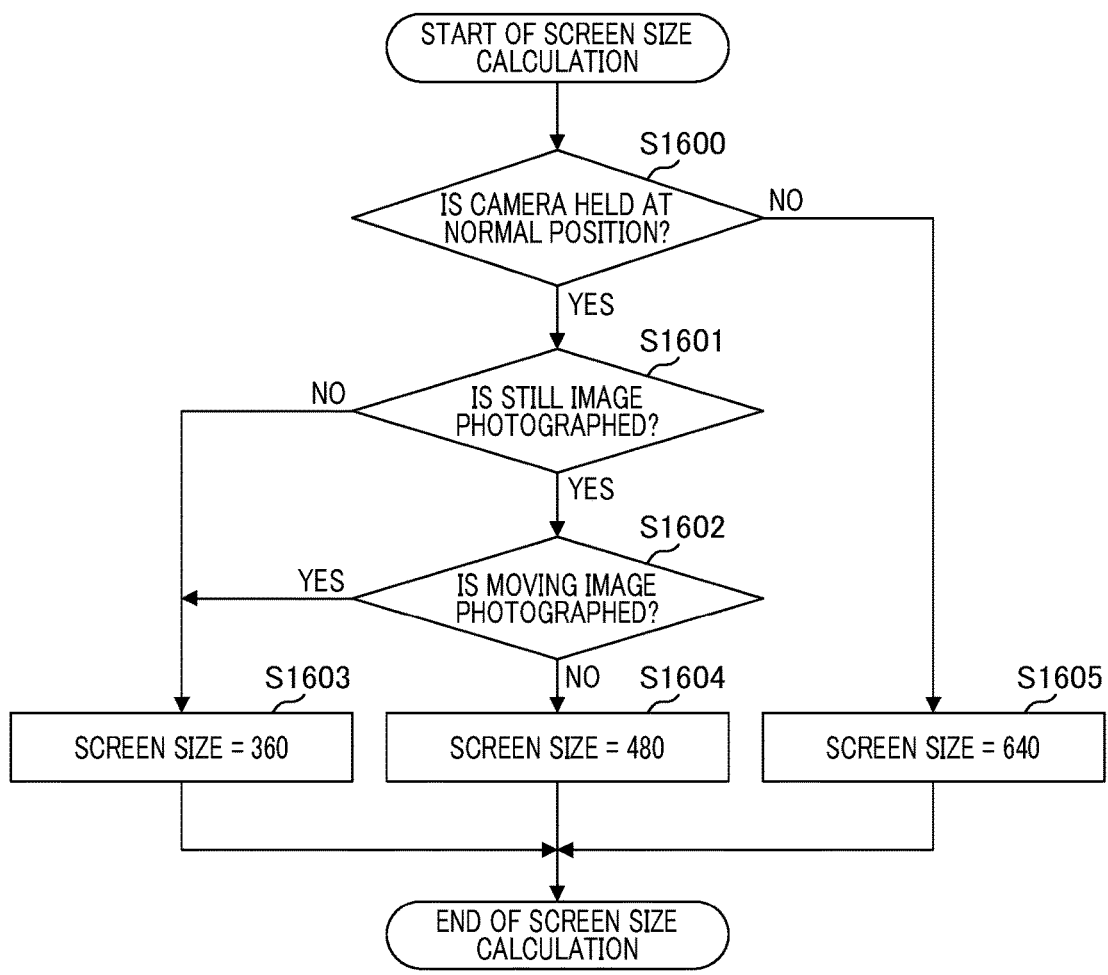
FIG. 16 is a flowchart for describing a screen size calculation process.

The reference size setting process of S804 illustrated in FIG. 8 will be described with reference to FIGS. 15 to 22. FIG. 15 is a flowchart illustrating an example of the reference size setting process stawhen a subject is a person. In S1500, the AZ control unit 122 first determines whether the composition setting stored in the memory 118 is "manual" described above. When the composition setting is "manual," the process proceeds to S1501. When the composition setting is not "manual," the process proceeds to S1503.

In S1501, the AZ control unit 122 performs subject detection determination. When the subject detection unit 123 detects that the subject is a person, the AZ control unit 122 determines whether the face is detected. When the subject is an object, the AZ control unit 122 determines whether the same feature color is detected. The determination process of S1501 is repeated until the subject is detected. When the subject is detected, the process proceeds to S1502. In S1502, the AZ control unit 122 sets the size of the detected subject image as a reference size and stores the size in the memory 118. Then, the process ends. Accordingly, when the composition setting is "manual," the size (detection size) of the subject image first detected at the time of starting of the reference size setting process is stored as the reference size in the memory 118.

In S1503, the AZ control unit 122 calculates a screen size based on the posture information of the camera determined by the posture detection unit 124. This screen size is used to calculate a reference size in S1514, S2004, S2005, S2106, and S2107 to be described below. A screen size calculation process will be described with reference to FIG. 16. In the embodiment, a case in which the screen size of a still image is set to "long side×short side=640×480" and the screen size of a moving image is set to "long side×short side=640×360" will be exemplified. However, the screen size is not limited thereto.

In S1600, the posture detection unit 124 determines whether the photographer holds the camera at the normal position or holds the camera at the vertical position. When it is determined that the photographer holds the camera at the normal position (yes in S1600), the process proceeds to S1601. Here, a ratio of the face to the screen in the short side direction is calculated as the reference size. In S1601, it is determined whether a still image is being photographed. Next, in S1602, it is determined whether a moving image is being photographed. When only the still image is being photographed (yes in S1601 and no in S1602), the process proceeds to S1604 and 480 which is the short side size of the screen of the still image is set as the screen size. When only the moving image is being photographed (no in S1601), the process proceeds to S1603 and 360 which is the short side size of the screen of the moving image is set as the screen size. In a mode in which the still image and the moving image are simultaneously being photographed (yes in both of S1601 and S1602), the process proceeds to S1603. In this case, the short side size of the screen of the moving image is compared to the short side size of the screen of the still image, and 360 which is the smaller size is set as the screen size. This is because a subject is prevented from falling outside of a screen at any angle of view of the still image and the moving image by performing automatic zoom in accordance with the small screen size.

Conversely, when the photographer holds the camera at the vertical position (no in S1600), the process proceeds to S1605. In this case, 640 which is the long side size of the screen is set as the screen size.

The above-described method is a method of deciding the screen size to be used to calculate the reference size based on the posture of the camera on the presupposition that a person is standing. When the direction of the face can be determined by the subject detection unit 123, the direction of the screen size used to calculate the reference size may be decided based on the vertical direction of the face on the screen. In the embodiment, the example in which the screen size of a still image is 4:3 (see FIGS. 18A and 18B) and the screen size of a moving image is 16:9 (see FIG. 18C) is described, but the screen size may be changed according to an aspect ratio. A ratio of an image of a person to a screen can be set to be constant irrespective of the aspect ratio.

When the screen size is decided in S1503 of FIG. 15, the process proceeds to S1504. When the composition setting stored in the memory 118 is one of "face," "upper body," and "whole body," the AZ control unit 122 decides a ratio (referred to as a face ratio) of the size of a face image to the screen according to the composition setting in S1504 to S1509. The face ratio according to the embodiment is a ratio of the length of the face tracking frame to the screen in the vertical direction, but may be a ratio of the length of the face tracking frame to the screen in the horizontal direction, an area ratio, or the like. Specifically, for example, it is determined in S1504 whether the composition setting is "face." When the composition setting is "face" (yes in S1504), the face ratio is decided as 27% (S1507). When the composition setting is not "face," the process proceeds to S1505 to determine whether the composition setting is "upper body." When the composition setting is "upper body" (yes in S1505), the face ratio is decided as 16% (S1508). When the composition setting is not "upper body," the process proceeds to S1506 to determine whether the composition setting is "whole body." When the composition setting is "whole body" (yes in S1506), the face ratio is decided as 7% (S1509). After the face ratio is decided in the steps from S1504 to S1509, the process proceeds to S1510.

In S1510, the AZ control unit 122 calculates the reference size by multiplying the face ratio decided in S1504 to S1509 by an S screen size. Further, after the process of storing the calculated reference size in the memory 118 is performed, the reference size setting process ends. Accordingly, when the composition setting is one of "face," "upper body," and "whole body," a size with a predetermined face ratio according to the composition setting to the screen size is set as the reference size.

When the composition setting is not "whole body" in S1506, that is, the composition setting is determined to be "auto," the process proceeds to S1511. Then, the AZ control unit 122 automatically determines an appropriate composition according to a photographing state, the number of subjects, a motion of the subject, or the like. An automatic composition determination and composition selection process in the composition setting of "auto" of S1511 will be described with reference to FIG. 17. The composition setting "auto" is a mode in which composition matching can be performed more simply by determining a photographing scene and causing the camera to automatically select an appropriate composition (automatic composition selection).

Figure 17:
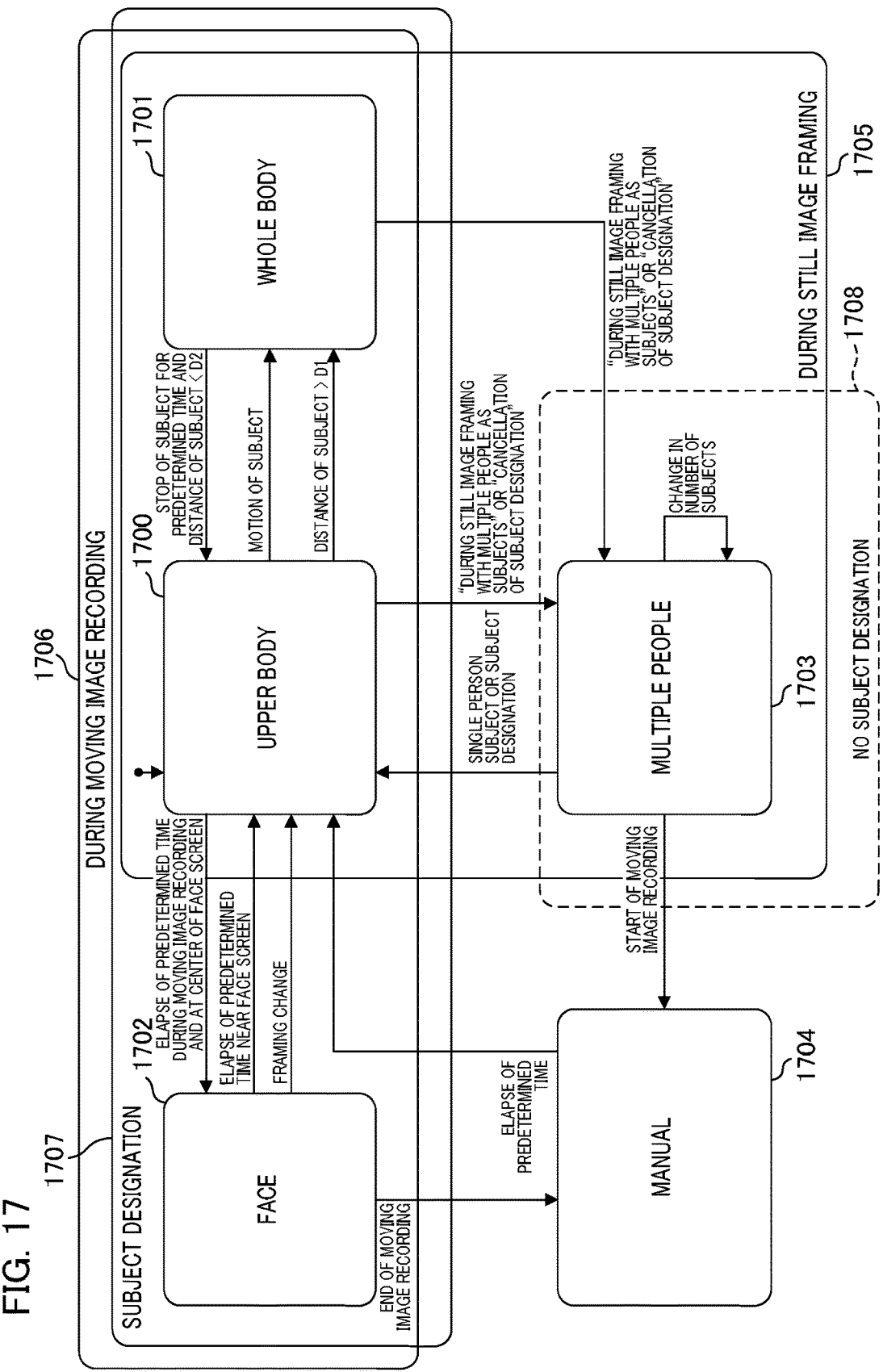
FIG. 17 is a transition diagram for describing automatic composition determination in composition setting "auto."

FIG. 17 is a transition diagram of the composition automatically selected in the embodiment. In the embodiment, a composition selection process of selecting an appropriate composition among five compositions, upper body 1700, whole body 1701, face 1702, multiple people 1703, and manual 1704 according to a photographing scene is performed. In a composition matching manipulation, it is necessary to set a subject image such that the subject image has an appropriate size instantly before photographing when a still image is photographed. On the other hand, when a moving image is photographed, it is necessary to set a subject image such that the subject image normally has an appropriate size during the photographing such as continuous tracking of a subject or approach of a stopped subject. When a moving image is photographed, image data at the time of a zoom-in operation or a zoom-out operation from a change in the composition is recorded. Therefore, a video can be effectively photographed by changing the composition at an appropriate timing. In this way, an appropriate composition differs between a still image and a moving image. When the user designates one person as a subject from a plurality of people serving as subjects, it is determined that the user intends to photograph the designated subject as a main subject and the size of an image of the main subject is changed to an appropriate size. In this way, an appropriate composition is also different according to whether the subject is designated. Therefore, in the embodiment, the composition to be selected is changed in accordance with photographing states during still image framing 1705 and during moving image recording 1706 and according to whether there is subject designation 1707 (first operation state) and there is no subject designation 1708 (second operation state). In the embodiment, during the still image framing 1705, the composition is selected from upper body 1700, whole body 1701, and multiple people 1703 which are selection candidates. During the moving image recording 1706, the composition is selected from upper body 1700, whole body 1701, and face 1702 which are selection candidates. When there is subject designation 1707, the composition is selected from upper body 1700, whole body 1701, and face 1702 which are selection candidates. When there is no subject designation 1708, the composition of multiple people 1703 is selected.

Here, determination conditions of photographing scenes and transition of each composition will be described. When the automatic composition determination process S1511 of the composition setting "auto" starts, upper body 1700 is set as the composition of an initial state. The composition of upper body 1700 is a composition selected when a stopped singular subject is determined to be a photographing scene during the still image framing 1705 or during the moving image recording 1706 or when the subject designation 1707 is set. In such a scene, a composition of approach to a subject can be appropriately set by setting a composition in which the upper body of the subject is fitted in the screen.

When a motion of a photographing target subject is detected in the composition of upper body 1700 or when a distance between the camera and the subject is determined to be greater than a predetermined distance D1 (first threshold value), the composition is changed to whole body 1701. The composition of whole body 1701 is a composition selected in the following cases:

a case in which a subject moving, that is, a subject that could easily fall outside of a screen, is determined to be part of a photographing scene during the still image framing 1705 or during the moving image recording 1706 or a distant subject; or the case in which there is subject designation 1707. In such a scene, by tracking the subject in the composition in which the whole body of the subject is fitted, the subject is set to fall outside of the screen as little as possible. When it is detected that the photographing target subject stops for a predetermined time or more in the composition of whole body 1701 and it is determined that the distance between the camera and the subject is less than a predetermined distance D2 (second threshold value), a process of returning the composition to upper body 1700 is performed. The predetermined time is a determination standard time set in advance.

Hereinafter, a method of determining a motion or stop of the subject will be described. When at least one of a change amount of position or size of the subject detected by the subject detection unit 123 or a shake amount detected by the shake detection unit 125 in the detection state of the subject is greater than a predetermined amount, the photographing target subject is determined to be moving. When the state in which both of the change amount of position or size of the subject detected by the subject detection unit 123 and the shake amount detected by the shake detection unit 125 in the detection state of the subject are less than the predetermined amount continues for a predetermined time or more, the photographing target subject is determined to be stopped. A time in which the detection state continues is assumed to be measured by a measurement timer.

Further, a method of calculating the distance between the camera and the subject will be described. First, a focal distance serving as a reference and a subject distance in regard to a subject size are measured in advance and measurement data is stored in the memory 118. The subject distance is calculated by performing calculation of "subject distance=(reference subject distance×focal distance×reference subject size)/(reference focal distance×detection size)" in regard to reference values stored in the memory 118. For example, when the reference values are the reference subject distance of 2 m, the reference focal distance of 24 mm, and the reference subject size of 20 pix (pixels), a case in which a subject image with a detection size of 40 pix is detected with a focal distance of 120 mm is assumed. In this case, the subject distance is calculated as "(2 m×120 mm×20 pix)/(24 mm×40 pix)=5 m."

Next, a composition when multiple people are detected as subjects in a screen will be described. When a plurality of people are detected as subjects in a screen in the composition of upper body 1700 or whole body 1701 during the still image framing 1705 or when the designation is cancelled from the subject designation state, a process of changing the composition to multiple people 1703 is performed. The number of subjects detected at this time is stored in the memory 118. The composition of multiple people 1703 is a composition selected when all of the plurality of subjects are determined to be a photographing scene of a group photo fitted at a predetermined angle of view during the still image framing 1705 or when there is no subject designation. In the composition state of multiple people 1703, a process of determining whether the number of detected subjects is changed is performed. When the number of detected subjects increases, a new subject enters the screen, the number of subjects stored in the memory 118 is thus updated instantly, and the composition is changed. Conversely, when the number of detected subjects decreases, there is a possibility of a temporarily undetectable state, for example, as in a case in which one subject is oriented horizontally. Therefore, when the composition is instantly changed, there is a possibility of an undetectable subject having fallen outside of the frame. Accordingly, when the number of subjects decreases, this state is determined to continue over a predetermined time or more. When this state continues for the predetermined time or more, the number of subjects stored in the memory 118 is updated and the composition is changed. Further, when the number of subjects is one person, a process of returning the composition to upper body 1700 is performed.

When a composition in which all of the subjects are fitted at an angle of view is set during the moving image recording 1706 and a subject other than the photographing target is moving, there is a concern of an erroneous operation of zoom occurring in response to this subject. Accordingly, when a plurality of people are detected as subjects during the moving image recording 1706, a process of setting only a main subject as a photographing target and maintaining upper body 1700 or whole body 1701 as the composition is performed. When a face is detected near the center of the screen over a predetermined time or more in the composition of upper body 1700 during the moving image recording 1706, a process of changing the composition to face 1702 is performed. The composition of face 1702 is a composition selected when a scene in which the photographer is interested in the face of the subject is determined during the moving image recording 1706. In such a scene, the face of the subject of interest can be photographed with a larger size by setting the composition that approaches the face more than the upper body. By changing a zoom speed to a speed considerably lower or higher than a normal speed during a zoom-in operation by the change in the composition, a more effective video can be photographed. Further, when a face is detected near the periphery of a screen over a predetermined time or more in the composition of face 1702 or the photographer is determined to change framing, a process of returning the composition to upper body 1700 is performed. In the embodiment, a periphery region of a screen is exemplified as a predetermined region, and a continuous time of a state in which the position of a face image of a subject detected by the subject detection unit 123 is the periphery region is measured by a measurement timer. As a method of determining the change of the framing, the photographer is determined to change the framing when the subject detection unit 123 does not detect the subject and the shake amount detected by the shake detection unit 125 is greater than the predetermined amount.

During the still image framing 1705, the photographer sometimes continues to wait to take a picture in the same composition until the direction or expression of the face of a person becomes a desired state. In this case, when the composition of approach to the face is set, there is a possibility of the composition being a different composition from that intended by the photographer. Accordingly, even when the face is detected near the center of the screen for a predetermined time or more in upper body 1700 during the still image framing 1705, a process of maintaining the composition of upper body 1700 is performed.

Next, a composition at the time of the change in a photographing state by start/end of the moving image recording will be described. The compositions of upper body 1700 and whole body 1701 are compositions selectable in both cases during the still image framing 1705 or during the moving image recording 1706. Accordingly, in these compositions, the original composition is maintained even when the photographing state is changed. On the other hand, the compositions of multiple people 1703 and face 1702 are compositions selected only in one case during the still image framing 1705 or during the moving image recording 1706. Accordingly, when the moving image recoding starts in the composition of multiple people 1703 during the still image framing 1705 or the moving image recording ends in the composition of face 1702 during the moving image recording 1706, the change to upper body 1700 which is a common composition is considered. However, in this case, there is a concern of an image being recorded in a zoom state in the beginning of a moving image if the zoom operation starts along with the start or end of the moving image recording, or of the photographer feeling annoyed in the still image framing. Accordingly, when the photographing state is changed in such a state, a process of temporarily changing the composition to manual 1704 is performed. The composition of manual 1704 is a composition in which the size of a main subject image first detected after the change of the composition is set to the reference size. Accordingly, the zoom operation does not immediately start due to the change of the photographing state and the photographer does not feel the sense of discomfort. Even when a subject starts to move, the size of a subject image can be maintained. Further, when a predetermined time has passed in the composition of manual 1704, a process of returning the composition to upper body 1700 is performed.

As described above, when the composition setting is "auto" in S1511 of FIG. 15, an appropriate composition is automatically determined according to the photographing state, the number of subjects, a motion of the subject, or the like. Data indicating the composition after the determination is stored in the memory 118 and the process proceeds to S1512.

In S1512, it is determined whether the composition determined in S1511 is changed from the immediately previous composition (whether the composition selected in FIG. 17 transitions or the number of subjects is changed in the state of multiple people 1703). When the composition is not changed, the reference size setting process ends without updating the reference size. When the composition is changed, the process proceeds to S1513 to determine whether the selected composition is manual 1704. When the selected composition is manual 1704, the process proceeds to S1501 and the size of the first detected subject is stored as the reference size in the memory 118. When the selected composition is not manual 1704 in S1513, the process proceeds to S1514 and the reference size calculation process in the composition setting "auto" is performed.

Hereinafter, the reference size calculation process in the composition setting "auto" will be described with reference to FIGS. 18A to 22. When the composition setting is one of "face," "upper body," and "whole body," the reference size is calculated so that a face has a constant ratio with respect to the screen size in S1510 of FIG. 15. That is, the same reference size is calculated irrespective of the position of the subject image on the screen. Therefore, when the composition is changed so that the subject image increases (is zoomed in on) in a case in which the subject is present in the periphery of the screen, there is a possibility of the subject falling outside of the frame. When the reference size is calculated with this method, it is necessary for the photographer to frame the subject near the center of the screen. Accordingly, this method is not appropriate, for example, when the subject is shifted from the center of the screen and is photographed along with a background. When there are a plurality of subjects, it is necessary to calculate the reference size with another method. Accordingly, when the composition setting is "auto," the size of the subject image is decided based on the composition determined in S1511 of FIG. 15 and a process of calculating the reference size so that the subject is fitted in the screen irrespective of the position of the detected subject is performed.

Figure 18A:
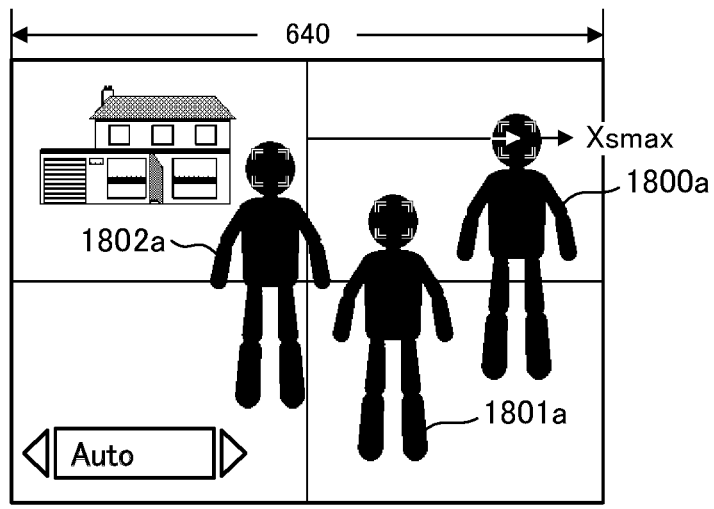
FIGS. 18A to 18C are diagrams illustrating subject positions in the outermost periphery and screen sizes.
Figure 18B:
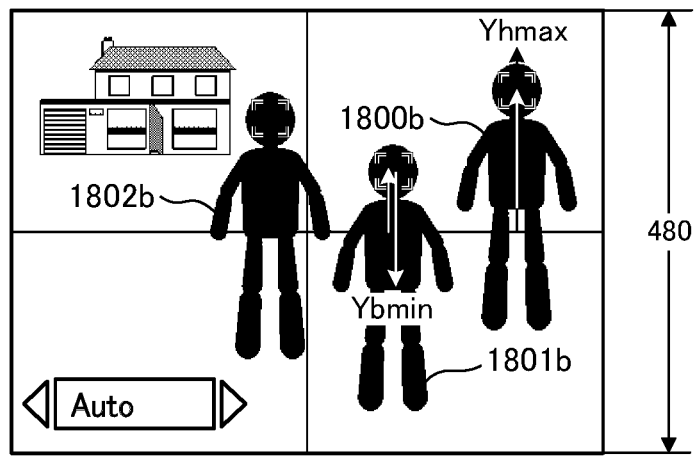
Figure 18C:
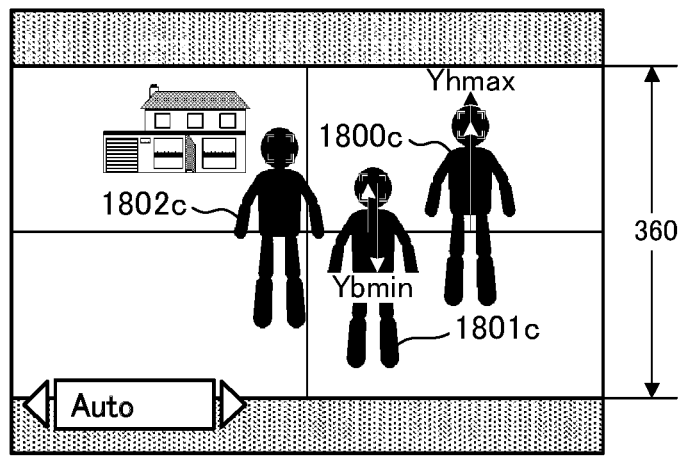
Figure 19:
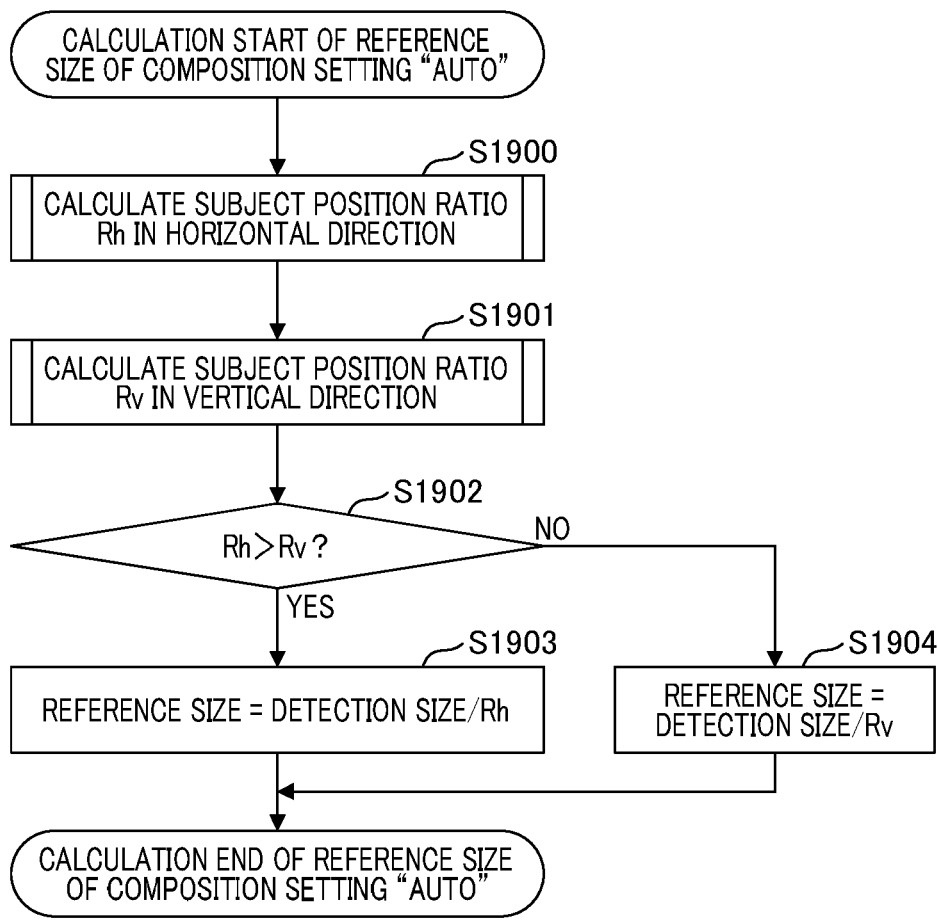
FIG. 19 is a flowchart for describing a process of calculating the reference size in the composition setting "auto."
Figure 20:
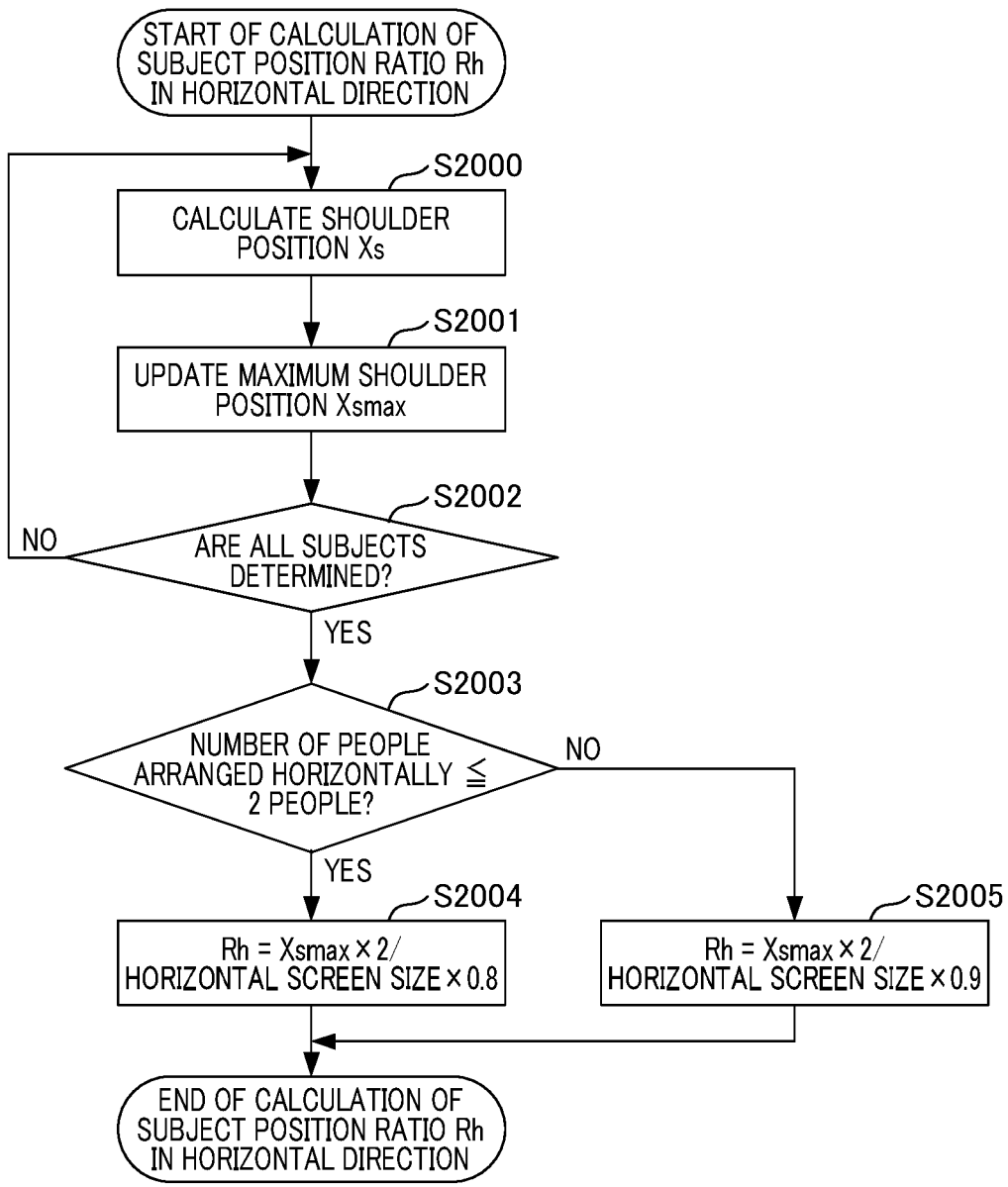
FIG. 20 is a flowchart for describing a process of calculating a subject position ratio in a horizontal direction.

FIGS. 18A to 18C are diagrams illustrating a relation between a screen size and the position of a subject closest to the periphery of the screen among a plurality of subjects. FIGS. 18A and 18B illustrate screen examples of still image photographing and FIG. 18C illustrates a screen example of moving image photographing and exemplifies a plurality of people as subjects. FIG. 19 is a flowchart illustrating an overall process of calculating the reference size in the composition setting "auto."

In S1900 of FIG. 19, a process of calculating a subject position ratio $Rh$ in the horizontal direction is first performed. The subject position ratio $Rh$ in the horizontal direction is a ratio of a distance $\times 2$ up to a horizontal position of a shoulder vicinity (hereinafter referred to as a shoulder position and denoted by $Xsmax$) of a subject closest to a periphery from the center of a screen to a predetermined ratio with respect to a screen size in the horizontal direction. The predetermined ratio is, for example, 80% or 90% of the screen size in the horizontal direction and is changed according to the number of people arranged in the horizontal direction in S2003 of FIG. 20 to be described below. In FIG. 18A, a subject closest to the periphery from the center of the screen in the horizontal direction is a subject 1800a among subjects 1800a, 1801a, and 1802a. A process of calculating the subject position ratio Rh in the horizontal direction will be described with reference to the flowchart of FIG. 20.

In step S2000, a shoulder position of the subject (denoted by Xs) is calculated based on a central position or size of the face tracking frame of the subject. The center of the screen is assumed to be the origin (0, 0), the central position of the face tracking frame is assumed to be (Xc, Yc), and the size of the face tracking frame is assumed to be S. When Ns is the number of face tracking frames located in a distance from the central position of the face tracking frame to the shoulder position, the shoulder position Xs on the side of the periphery of the screen can be calculated as "Xs=|Xc|+S× Ns." FIG. 22 illustrates a setting example of Ns. A value of Ns is changed according to the composition determined in S1511 of FIG. 15. For example, in the composition of face 1702, Ns=1 (in this case, a horizontal position of the vicinity of an ear rather than the shoulder position) is set. In other cases ("upper body," "whole body," and "multiple people"), Ns=2 is set.

After the shoulder position Xs of the subject is calculated, the process proceeds to S2001. In S2001, the shoulder position Xs calculated in S2000 is stored as the maximum shoulder position Xsmax when the maximum value Xsmax of the shoulder position is not stored in the memory 118. When the maximum shoulder position Xsmax is stored in the memory 118, the shoulder position Xs calculated in S2000 is compared to the maximum shoulder position Xsmax. When the shoulder position Xs is greater than the maximum shoulder position Xsmax, a process of updating the maximum shoulder position Xsmax in the memory 118 to the shoulder position Xs is performed. After the process of updating the maximum shoulder position Xsmax, the process proceeds to S2002. In S2002, it is determined whether a process of calculating the shoulder positions Xs of all the subjects and updating the maximum shoulder positions Xsmax ends. When the calculation of the shoulder position Xs and the updating of the maximum shoulder position Xsmax do not end, the process returns to S2000. When the determination of the maximum shoulder positions Xsmax of all the subjects ends and the updating of the maximum shoulder positions Xsmax ends, the process proceeds to S2003.

In S2003, a process of determining the number of people arranged as subjects in the horizontal direction (the number of people arranged in the horizontal direction) is performed. This is because a composition in which the subjects are fully centered in a screen is set when the number of subjects is larger as in a group photo, and a composition in which a margin remains in the periphery of the screen is set when the number of subjects is small. As a method of counting the number of people arranged in the horizontal direction, when the face tracking frames overlap in the vertical direction (the vertical direction of the screen), the overlapping subjects are counted as one person in total. For example, when four people are detected as subjects in the screen and the face tracking frames of two people among the four people detected as subjects overlap in the vertical direction of the screen, the number of people is counted as three. In S2003, the number of people arranged in the horizontal direction is compared to a threshold value (for example, two people). When the number of people arranged in the horizontal direction is determined to be equal to or less than two, the process proceeds to S2004. When the number of people arranged in the horizontal direction is determined to be equal to or greater than three, the process proceeds to S2005. In S2004 and S2005, each subject position ratio Rh in the horizontal direction is calculated. The subject position ratio Rh in the horizontal direction in S2004 is calculated as a ratio of the maximum shoulder position Xsmax×2 to 80% of the horizontal screen size. The subject position ratio Rh in the horizontal direction in S2005 is calculated as a ratio of the maximum shoulder position Xsmax×2 to 90% of the horizontal screen size. After S2004 or S2005, the process of calculating the subject position ratio Rh ends.

Next, a process of calculating the subject position ratio Rv in the vertical direction is performed in S1901 of FIG. 19. The subject position ratio Rv in the vertical direction is a ratio of a distance×2 up to a vertical position of the head of the subject (hereinafter referred to as a head position) or up to a vertical position of a body part (hereinafter referred to as a body position) of the subject closest to the periphery from the center of the screen to the predetermined ratio of the screen size in the vertical direction. The predetermined ratio is, for example, 90% of the screen size in the vertical direction. Hereinafter, the head position of the subject closest to the periphery from the center of the screen is denoted by Yhmax and the body position of the subject closest to the periphery from the center of the screen is denoted by Ybmix. Of the subjects 1800b, 1801b, and 1802b in FIG. 18B, a subject whose head is closest to the periphery from the center of the screen in the vertical direction is the subject 1800b, and a subject whose body is closest to the periphery from the center of the screen is the subject 1801b. A process of calculating the subject position ratio Rv in the vertical direction will be described with reference to the flowchart of FIG. 21.

Figure 21:
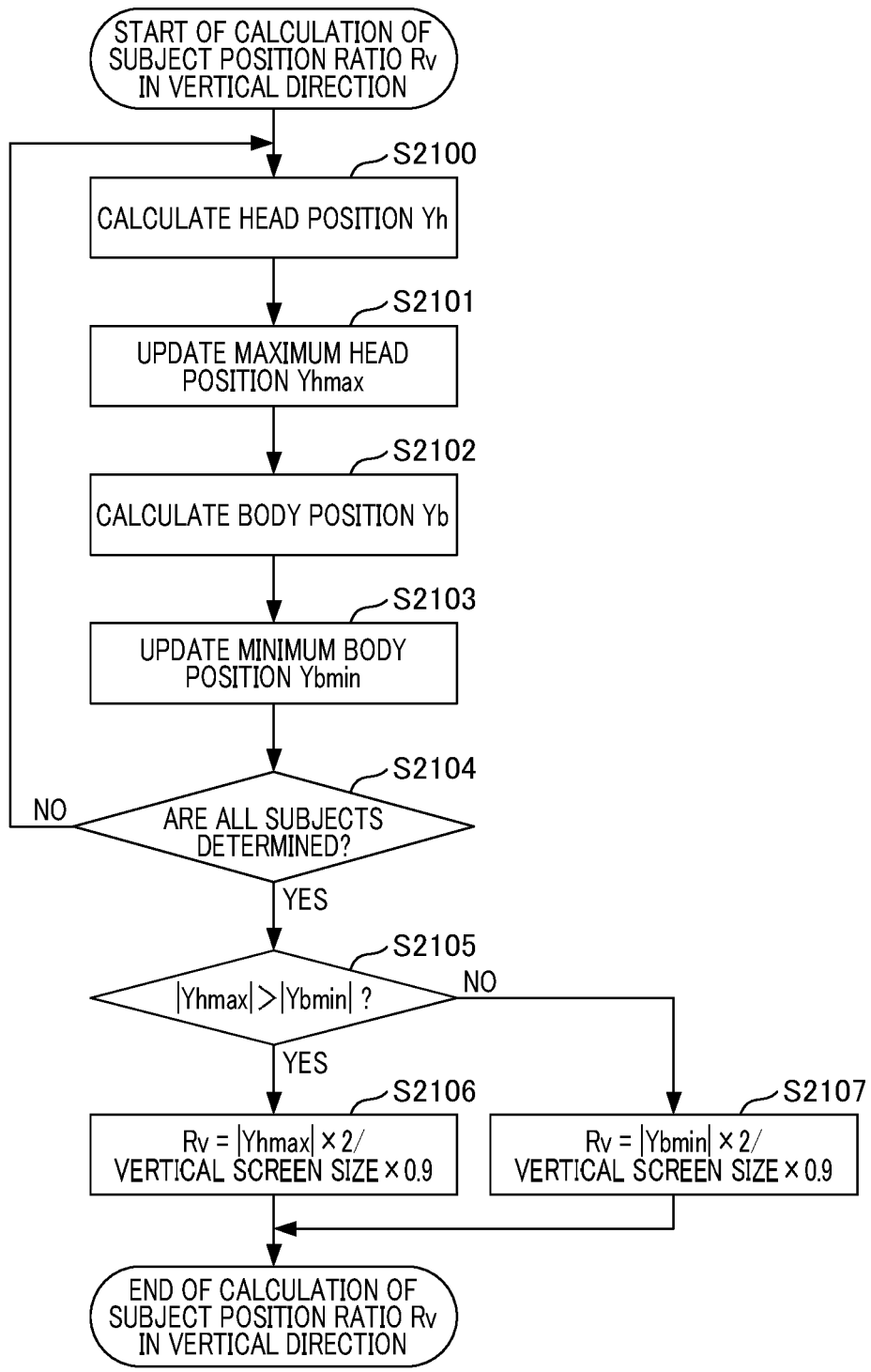
FIG. 21 is a flowchart for describing a process of calculating a subject position ratio in a vertical direction.

In S2100 of FIG. 21, the head position (denoted by Yh) of the subject is calculated based on the central position or size of the face tracking frame of the subject. The head position Yh can be calculated as "Yh=Yc+S×Nh." Nh indicates the number of face tracking frames located in a distance from the central position of the face tracking frame to the head position. A setting example of Nh is illustrated in FIG. 22. For a value of Nh, Nh=1.5 is set irrespective of the composition determined in S1511 of FIG. 15. After the head position Yh of the subject is calculated, the process proceeds to S2101.

In S2101, when a maximum value Yhmax of the head position is not stored in the memory 118, a process of storing the head position Yh calculated in S2100 as a maximum head position Yhmax is performed. When the maximum head position Yhmax is stored in the memory 118, the head position Yh calculated in S2100 is compared to the maximum head position Yhmax. When the head position Yh is greater than the maximum head position Yhmax, a process of updating the maximum head position Yhmax in the memory 118 to the head position Yh is performed. After the updating process, the process proceeds to S2102.

Next, in S2102, a body position (denoted by Yb) of the subject is calculated based on the central position or size of the face tracking frame of the subject. The body position Yb can be calculated as "Yb=Yc−S×Nb." Nb indicates the number of face tracking frames located in a distance from the central position of the face tracking frame to the body position. A setting example of Nb is illustrated in FIG. 22. A value of Nb is changed according to the composition determined in S1511 of FIG. 15. For example, in the case of the composition of face 1702, Nb=1.5 is set. In the case of the composition of upper body 1700, Nb=5 is set. In the case of the composition of whole body 1701, Nb=10 is set. In the case of the composition of multiple people 1703, Nb=3.5 is set. In this setting, the center of the screen is set at a chest in face 1702, at a part below the waist in upper body 1700, at a leg in whole body 1701, and at a position near a part above the waist in multiple people 1703. After the body position Yb of the subject is calculated, the process proceeds to S2103.

In S2103, when a minimum value Ybmin of the body position is not stored in the memory 118, a process of storing the body position Yb calculated in S2102 as a minimum body position Ybmin is performed. When the minimum body position Ybmin is stored in the memory 118, the body position Yb calculated in S2102 is compared to the minimum body position Ybmin. When the body position Yb is less than the minimum body position Ybmin, a process of updating the minimum body position Ybmin in the memory 118 as the body position Yb is performed. After the updating process, the process proceeds to S2104.

In S2104, the head positions Yh and the body positions Yb of all the subjects are calculated and it is determined whether a process of updating the maximum head position Yhmax and the minimum body position Ybmin ends. When the updating of the maximum head position Yhmax and the minimum body position Ybmin do not end, the process returns to S2100. When the determination of the maximum head positions Yhmax and the minimum body positions Ybmin of all the subjects ends and the updating of the maximum head positions Yhmax and the minimum body positions Ybmin ends, the process proceeds to S2105. In S2105, the absolute value of the maximum head position Yhmax is compared to the absolute value of the minimum body position Ybmin and a process of determining which value is located closer to the periphery of the screen is performed. When it is determined that the maximum head position Yhmax is located closer to the periphery of the screen, the process proceeds to S2106. When it is determined that the minimum body position Ybmin is located closer to the periphery of the screen, the process proceeds to S2107. In S2106 and S2107, each subject position ratio Rv in the vertical direction is calculated. In S2106, the subject position ratio Rv in the vertical direction is calculated as a ratio of the absolute value×2 of the maximum head position Yhmax to 90% of the vertical screen size. In S2107, the subject position ratio Rv in the vertical direction is calculated as a ratio of the absolute value×2 of the minimum body position Ybmin to 90% of the vertical screen size. After S2106 or S2107, the process of calculating the subject position ratio Rv in the vertical direction ends.

Subsequently, in S1902 of FIG. 19, the subject position ratio Rh in the horizontal direction is compared to the subject position ratio Rv in the vertical direction. Accordingly, the position at which the ratio is the largest among the ratios of the distances from the center of the screen to the respective positions of the subject in regard to the predetermined ratio of the screen size in each direction, that is, the position closest to the periphery of the screen, can be determined. The respective positions are the maximum shoulder position Xsmax, the maximum head position Yhmax, and the minimum body position Ybmin. When the subject position ratio Rh in the horizontal direction is determined to be greater than the subject position ratio Rv in the vertical direction, the process proceeds to S1903. When the subject position ratio Rh in the horizontal direction is determined to be equal to or less than the subject position ratio Rv in the vertical direction, the process proceeds to S1904. In S1903 and S1904, a process of calculating the reference size is performed based on the detection size of the main subject and the ratio of the subject position closest to the periphery of the screen determined in S1902. The reference size is calculated as "detection size/subject position ratio Rh in horizontal direction" in S1903 and is calculated by "detection size/subject position ratio Rv in vertical direction" in S1904. That is, in S1903, the zoom operation is performed so that the main subject image has the reference size obtained by multiplying the size of the main subject image by "1/subject position ratio Rh in horizontal direction." In S1904, the zoom operation is performed so that the main subject image has the reference size obtained by multiplying the size of the main subject image by "1/subject position ratio Rv in vertical direction." In this way, the subject can be set at the angle of view based on the composition determined in S1511 of FIG. 15 without the subject falling outside of the screen.

When the composition setting is "auto" in S1514 of FIG. 15, the subject position closest to the screen periphery in the horizontal direction and the vertical direction is determined based on the composition determined in S1511 and the reference size is calculated so that this subject position is fitted in the screen. Accordingly, regardless of a position on the screen at which the subject image is located, the subject can be fitted at an appropriate angle of view without falling outside of the frame. Whether the number of subjects is singular or plural, the reference size can be calculated through the same process. In the embodiment, the determination of the composition or the calculation of the reference size when the subject is a person has been exemplified. However, the invention can be applied even when the subject is an object. However, in this case, compositions to be selected are assumed to be "large," "medium," "small," and "multiple" instead of "face," "upper body," "whole body," and "multiple people." According to the compositions, the number of object tracking frames (corresponding to Ns, Nh, and Nb in the case of a person) when the subject position is calculated may be set.

When reference size setting process illustrated in FIG. 15 ends, the process proceeds to S805 of FIG. 8. In S805, the AZ control unit 122 performs automatic zoom control based on the subject information detected by the subject detection unit 123 and the reference size stored in the memory 118. The automatic zoom control will be described below with reference to FIG. 23. After the automatic zoom control ends, the process proceeds to S806. Then, the AZ control unit 122 determines whether the photographer gives an instruction to search for a subject. That is, the AZ control unit 122 determines whether the photographer presses the subject search button of the manipulation unit 117. When the subject search button is pressed, the process returns to S802 and the subject searching process is performed. Conversely, when the subject search button is not pressed, the process proceeds to S807. In S807, it is determined whether the automatic zoom target subject is changed through manipulation of the touch panel, a subject designation switch, or the like of the manipulation unit 117. When the subject is changed, the process returns to S803 to perform the subject designation process. Conversely, when the subject is not changed, the process proceeds to S808.

In S808, it is determined whether the composition setting is changed through manipulation of the left and right buttons of the manipulation unit 117 from the photographing screen. When the composition setting is changed, data of the composition setting stored in the memory 118 is updated, and subsequently the process returns to S804 to perform the reference size setting process. Conversely, when the composition setting is not changed, the process proceeds to S809. In S809, it is determined whether the automatic zoom manipulation switch of the manipulation unit 117 is pressed. When the automatic zoom manipulation switch is determined to be pressed, the automatic zoom function ends. Conversely, when the automatic zoom manipulation switch is determined not to be pressed, the process proceeds to step S810. In S810, a process of determining whether the composition setting stored in the memory 118 is "auto" is performed. When the composition setting is "auto," the process returns to S804 to perform the process of setting the reference size including the automatic composition determination. Conversely, when the composition setting is setting other than "auto," the process returns to S805 to continue the automatic zoom control.

Figure 23:
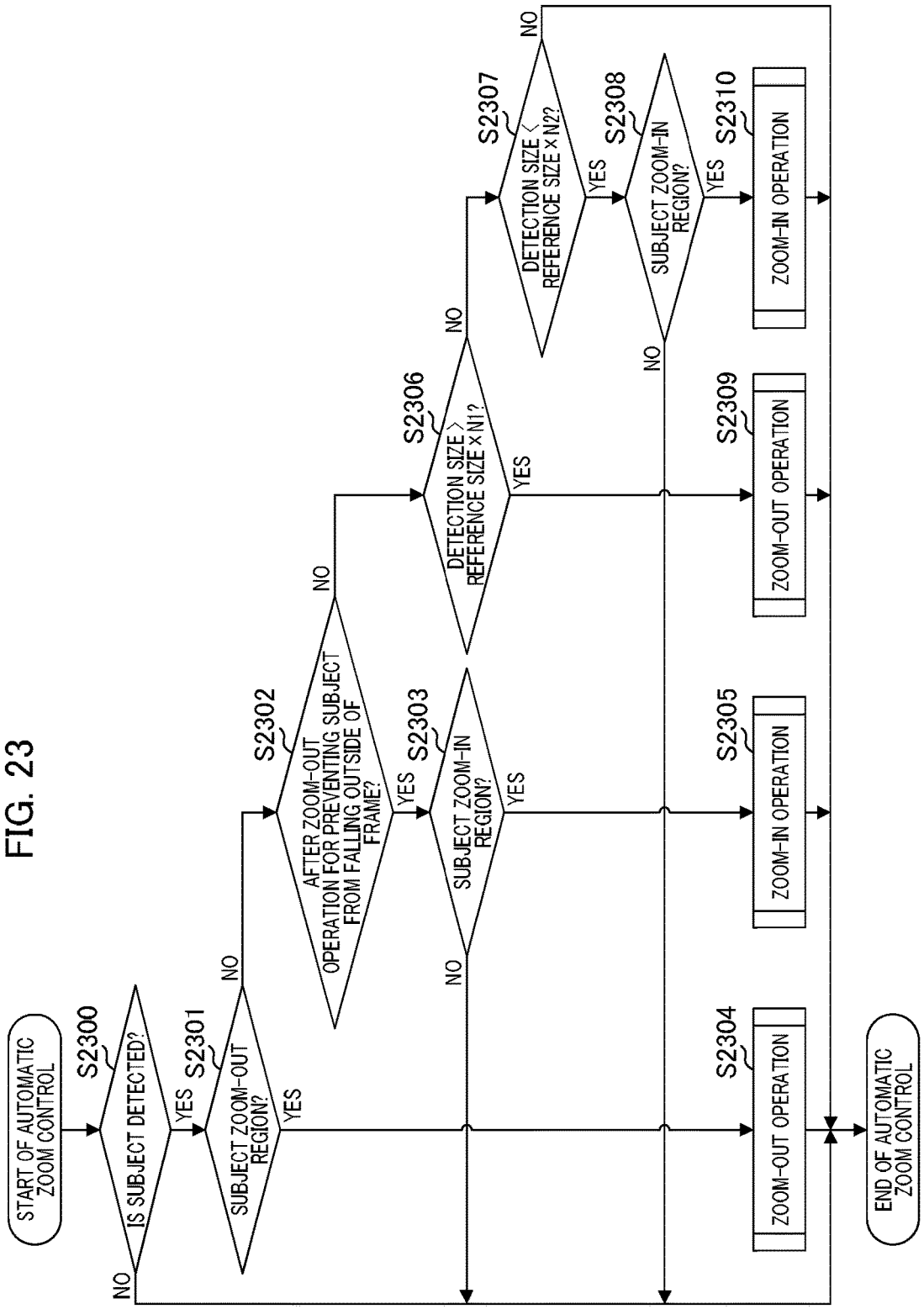
FIG. 23 is a flowchart for describing an automatic zoom control process.

Next, the automatic zoom control process of S805 will be described with reference to the flowchart of FIG. 23. In S2300, the AZ control unit 122 first determines whether the subject detection unit 123 detects the subject. When the subject is not detected in S2300, the automatic zoom control ends. When the subject is detected in S2300, the process proceeds to S2301. The determination of steps from S2301 to S2303 is an automatic zoom start determination process for control of preventing a subject from falling outside of the frame. That is, this process is performed to prevent a subject from falling outside of the screen, as described in the left figure of FIGS. 4 to 5C. In S2301, the AZ control unit 122 determines whether a subject tracking frame related to a tracking target subject enters a ZO region. This ZO region corresponds to the ZO region described in the left figure of FIG. 4 and FIGS. 5A to 5C. When the subject tracking frame enters the ZO region in S2301, that is, there is a high possibility of the subject falling outside of the frame, the process proceeds to S2304 to start a zoom-out operation. Here, the zoom-out operation corresponds to a zoom-out operation for the control of preventing the subject from falling outside of the frame. After the zoom-out operation, the automatic zoom control ends.

Conversely, when the subject tracking frame does not enter the ZO region in S2301, that is, when the camera captures the subject near the center of the screen, the process proceeds to S2302. In S2302, it is determined whether an immediately previous zoom operation is a zoom-out operation performed because the subject tracking frame entered the ZO region in S2301, that is, whether the immediately previous zoom operation is the zoom-out operation for the control of preventing the subject from falling outside of the frame. When it is determined in S2302 that the operation is performed after the zoom-out operation for the control of preventing the subject from falling outside of the frame, the process proceeds to S2303. Conversely, when it is determined in S2302 that the operation is not performed after the zoom-out operation for the control of preventing the subject from falling outside of the frame, the process proceeds to S2306.

In S2303, the AZ control unit 122 determines whether the subject tracking frame related to the tracking target subject is fitted (included) in a ZI region. Here, this ZI region corresponds to the ZI region described in the right figure of FIG. 4 and FIGS. 5A to 5C. When it is determined in S2003 that the subject tracking frame is not fitted in the ZI region, the automatic zoom control process ends. Conversely, when it is determined that the subject tracking frame is fitted in the ZI region, the process proceeds to S2305. That is, when the camera captures the subjects so that the subject size is within an angle of view near the center of the screen and at a zoom return position, a zoom-in operation starts in S2305. Here, the zoom-in operation corresponds to the zoom-in operation for the control of preventing the subject from falling outside of the frame. After the zoom-in operation, the automatic zoom control ends.

In the embodiment, to cause the control of preventing the subject from falling outside of the frame and the size maintenance control in the automatic zoom to be compatible, the subject is captured near the center of the screen for the control of preventing the subject from falling outside of the frame and the size maintenance control can be performed. Therefore, after the zoom-out operation for the control of preventing the subject from falling outside of the frame, an automatic zoom process (S2306 to S2310 below) of constantly maintaining a subject size to be described below (controlling size maintenance) is not performed. In other words, when the control of preventing the subject from falling outside of the frame is performed, the size maintenance control is not performed until the zoom-in operation for the control of preventing the subject from falling outside of the frame is completed.

Next, processes of S2306 to S2310 will be described. When it is determined in S2302 that the operation is not performed after the zoom-out operation for the control of preventing the subject from falling outside of the frame, the process proceeds to S2306. The AZ control unit 122 compares the detection size of the subject to a size obtained by multiplying the reference size by a predetermined ratio (denoted by N1 where N1>1). The size of the subject indicated by the information regarding the reference subject set in S1502 or S1510 and S1514 of FIG. 15 is compared to the size of the subject detected in S2300. When the size of the subject detected in S2300 is greater than N1 times the size of the reference subject, that is, a ratio of the subject image to the screen exceeds a predetermined value, the process proceeds to S2309. In S2309, the AZ control unit 122 starts a zoom-out operation. Here, this zoom-out operation corresponds to the zoom-out operation for the size maintenance control. After the zoom-out operation, the automatic zoom control ends.

Conversely, when the size of the subject detected in S2300 is equal to or less than N1 times the size of the reference subject in S2306, the process proceeds to S2307. In S2307, the AZ control unit 122 compares the size of the subject of the information regarding the reference subject to the size of the subject detected in S2300. When the size of the detected subject is less than the size of the reference subject at a predetermined ratio (denoted by N2 where N2<1) (less than N2 times), that is, a ratio of the subject image to the screen is less than a predetermined value, the process proceeds to S2308. Conversely, when the size of the detected subject is equal to or greater than N2 times the size of the reference subject, the automatic zoom control ends.

In S2308, the AZ control unit 122 determines whether the subject tracking frame related to the tracking target subject is fitted (included) in a ZI region. This is because the subject is prevented from falling outside of the frame by the zoom-in operation when the subject is in the periphery of the screen. Here, this ZI region corresponds to the ZI region described in the center figure of FIG. 6B. When it is determined in S2308 that the subject tracking frame is not fitted in the ZI region, the automatic zoom control process ends.

Conversely, when it is determined in S2308 that the subject tracking frame is fitted in the ZI region, the process proceeds to S2310. In S2310, the AZ control unit 122 starts a zoom-in operation. Here, this zoom-in operation corresponds to the zoom-in operation for the size maintenance control. In this way, in the embodiment, to prevent the subject from falling outside of the frame even in the zoom-in operation for the size maintenance control, the subject image is fitted in the ZI region and then the zoom-in operation starts. After the zoom-in operation, the automatic zoom control ends.

Figure 24:
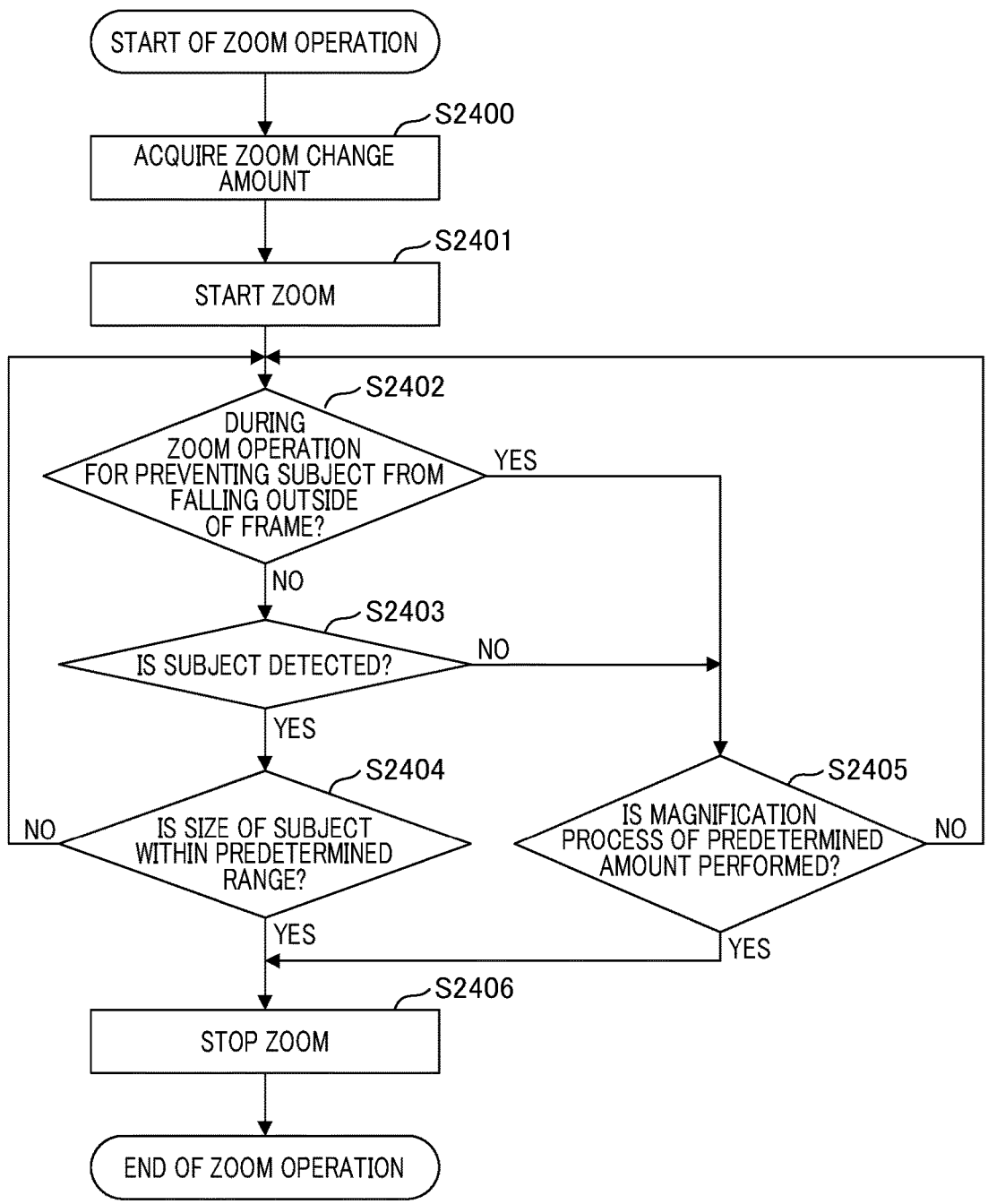
FIG. 24 is a flowchart for describing a zoom operation.

Next, a zoom operation will be described with reference to FIG. 24. FIG. 24 is a flowchart for describing the zoom-out operation or the zoom-in operation in S2304, S2305, S2309, and S2310 of FIG. 23. First, in S2400, the AZ control unit 122 acquires a zoom change amount (a change amount of zoom magnification) from the memory 118. In the case of the zoom-out operation for the control of preventing the subject from falling outside of the frame, a zoom-out change amount is set according to the information regarding the detected subject. Specifically, in the zoom-out operation for the control of preventing the subject from falling outside of the frame (S2304 of FIG. 23), the zoom-out change amount is set to be smaller as the size of the subject is smaller. Accordingly, it is possible to prevent the subject from becoming too small due to the zoom-out operation and not being detected. In consideration of a detectable minimum size of the subject, the zoom-out operation may not be performed when the size of the subject is less than a predetermined size. In a zoom-in operation for the control of preventing the subject from falling outside of the frame, a zoom magnification before start of the zoom-out operation is stored in the memory 118. A zoom-in change amount is set so that the zoom magnification is the same as the zoom magnification before the start of the zoom-out operation.

In the zoom-out operation for the size maintenance control (S2309 of FIG. 23), a zoom-out change amount (1/N1 times) corresponding to a predetermined N1 times used for the determination of S2306 is set. Accordingly, even when the subject is undetectable, a minimum zoom-out operation can be performed until the size of the subject becomes the size of the reference subject. Similarly, in the zoom-in operation for the size maintenance control (S2310 of FIG. 23), a zoom-in change amount (1/N2 times) corresponding to a predetermined N2 times used for the determination of S2307 is also set.

In S2401, the AZ control unit 122 sets the zoom change amount acquired in S2400 in the CZ control unit 119 or the electronic zoom control unit 120 and gives an instruction to perform a magnification process. Next, in S2402, the AZ control unit 122 determines which zoom operation is being performed between the zoom operations for the control of preventing the subject from falling outside of the frame and for the size maintenance control. When the zoom operation at the current time is the zoom operation for the control of preventing the subject from falling outside of the frame (S2304 and S2305 of FIG. 23), the process proceeds to S2405. Conversely, when the zoom operation at the current time is the zoom operation for the size maintenance control (S2309 and S2310 of FIG. 23), the process proceeds to S2403.

In S2403, the AZ control unit 122 determines whether the subject detection unit 123 detects the subject. When the subject is detected, the process proceeds to S2404. When the subject is not detected, the process proceeds to S2405. In S2404, the size of the subject indicated by the information regarding the reference subject is compared to the size of the subject detected in S2403. When the size of the subject detected in S2403 and the size of the reference subject are determined not to be within a predetermined ratio range (within a predetermined change amount) as the result of the comparison, the process proceeds to S2402 again and the determination of the zoom operation continues. When the size of the subject detected in S2403 and the size of the reference subject are within the predetermined ratio range through the zoom operation, the process proceeds to S2406. In S2406, the AZ control unit 122 stops the zoom operation, and then ends the zoom operation process.

When it is determined in S2402 that the zoom operation is the zoom operation for the control of preventing the subject from falling outside of the frame or the subject is not detected during the zoom operation for the size maintenance control in S2403, the process proceeds to S2405. In S2405, based on the zoom change amount acquired in S2400, the AZ control unit 122 determines whether a magnification process corresponding to the zoom change amount of a predetermined amount according to each zoom operation is performed. When the magnification process of the predetermined zoom change amount is not performed, the process returns to S2402 again to continue the process. Conversely, when the magnification process of the predetermined zoom change amount is performed, the process proceeds to S2406 and the AZ control unit 122 stops the zoom during the operation and ends the zoom operation process.

In the embodiments, a photographing scene is determined in accordance with a motion of a subject, the number of subjects, a detection time of a subject, and a distance from a camera to a subject, and then the camera automatically selects an appropriate composition according to the scene. A selected composition is changed according to photographing states of a still image and a moving image and whether or not a subject is designated. A reference size of a subject image is set based on the composition selected through the composition selection process, and a zoom operation is performed so that an image of the detected subject has the reference size. Accordingly, the automatic zoom control can be realized such that the appropriate composition is selected according to whether or not a subject is designated without a photographer selecting the composition.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-260110, filed Dec. 24, 2014, which is hereby incorporated by reference wherein in its entirety.

What is claimed is:

1. A zoom control device comprising:
a memory holding a program;
at least one processor which executes the program held in the memory so as to function as:
a subject detection unit configured to detect a subject image from an image;
a designation unit configured to designate a photographing target subject from the subject image detected by the subject detection unit and to cancel the designation;
a scene composition selection unit configured to automatically select a specific scene composition from among a plurality of scene composition candidates; and
a control unit configured to control the zoom magnification based on the specific scene composition selected by the scene composition selection unit,
wherein when a plurality of subject images is detected from the image by the subject detection unit, the control unit changes the zoom magnification in accordance with a switch to a first state from a second state, and
wherein the first state is a state of the photographing target subject is designated by the designation unit, and the second state is a state of the photographing target subject is not designated by the designation unit.

2. The zoom control device according to claim 1, wherein when a plurality of subject images is detected from the image by the subject detection unit, the control unit changes the zoom magnification according to switch to the second state from the first state.

3. The zoom control device according to claim 1,
when a plurality of subject images is detected from the image by the subject detection unit in the first state, the scene composition selection unit selects a first scene composition, and
when a plurality of subject images is detected from the image by the subject detection unit in the second state, the scene composition selection unit selects a second scene composition which is different from the first scene composition.

4. The zoom control device according to claim 3,
when a plurality of subject images is detected from the image by the subject detection unit in the first state, the scene composition selection unit selects the first scene composition, from among a plurality of a first scene composition candidates, according to at least one of a position of the photographing target subject, a distance of the photographing target subject, a motion of the photographing target subject and a continuous time of a state in which a position of the photographing target subject detected by the subject detection unit is in a specific region of the image, and
when a plurality of subject images is detected from the image by the subject detection unit in the second state, the scene composition selection unit selects a second scene composition which is not included the plurality of a first scene composition candidates.

5. The zoom control device according to claim 1,
wherein the zoom magnification based on the scene composition is automatically changed to compensate for the subject image falling outside of a frame of the image.

6. The zoom control device according to claim 1,
wherein, in the first state, the control unit controls the zoom magnification in which the photographing target subject designated by the designation unit from among all of the subject images detected by the subject detection unit is fitted at an angle of view.

7. The zoom control device according to claim 1,
wherein, in the second state, the scene composition selection unit selects the scene composition in which the control unit controls the zoom magnification so that all of the subjects detected by the subject detection unit are fitted at an angle of view.

8. The zoom control device according to claim 1, at least one processor further functioning as:
a timer configured to measure a continuous time of a state in which a position of the subject image detected by the subject detection unit is in a specific region of the image,
wherein, in the first state, the scene composition selection unit changes the selected scene composition based on the continuous time measured by the timer.

9. The zoom control device according to claim 1, further comprising:
a reception unit configured to receive a manipulation to designate a photographing target subject and to cancel the designation by a user,
wherein the designation unit designates the photographing target subject and cancels the designation according to the manipulation received by the reception unit.

10. The zoom control device according to claim 1,
wherein the control unit controls the zoom magnification so that the size of the subject image detected by the subject detection unit is within a range of a predetermined change amount with respect to the reference size.

11. The zoom control device according to claim 1,
wherein when a plurality of subject images is detected by the subject detection unit and the control unit configured controls the zoom magnification when photographing target subject is not designated by the designation unit, when one photographing target subject is designated by the designation unit, the scene composition selection unit determines whether or not to switch from a second scene composition to a third scene composition after switching the selected scene composition from a first scene composition to the second scene composition according to a photographic scene.

12. The zoom control device according to claim 1,
further comprising a memory configured to store a number of subjects detected by the subject detection unit,
wherein the scene composition selection unit updates the number of subjects stored in the memory from a first number to a second number, when the number of subjects detected by the subject detection unit decreases from a first number to a second number and a state in which the number of the detected subjects is the second number has continued for a predetermined time or more.

13. The zoom control device according to claim 1,
wherein when the photographing target subject is specified from a state in which the photographing target subject is not specified, the scene composition selection unit selects a first scene composition from the plurality of scene composition candidates, and can change the selected scene composition to another scene composition of the multiple of scene composition candidates based on at least one of movement information of the subject and distance information to the subject while the first scene composition is being selected.

14. An imaging apparatus comprising:
an imaging unit configured to perform photoelectric conversion of a subject image to generate an image and;
the zoom control device according to claim 1,
wherein the subject detection unit is configured to detect the subject image from the image generated by the imaging unit.

15. The imaging apparatus according to claim 14, further comprising:
a display configured to display the subject image detected by the subject detection unit when the photographing target subject is designated and the designation is cancelled by the designation unit.

16. The imaging apparatus according to claim 14,
wherein, when the control unit controls a zoom-out operation that prevents the photographing target subject designated by the designation unit from falling outside of a screen, the control unit limits an execution of control for maintaining a size of the main subject image at the reference size until the end of a zoom-in operation performed after the zoom-out operation.

17. The zoom control device according to claim 1,
at least one processor further functioning as:
a setting unit configured to set a reference size of the subject image used to control a zoom magnification based on the specific scene composition selected by the scene composition selection unit,
wherein the control unit controls the zoom magnification based on the reference size set by the setting unit and a size of the subject image sequentially detected by the subject detection unit.

18. A control method performed in a zoom control device, the method comprising:
acquiring detection information of a subject image detected from an image;
designating a photographing target subject from the subject image indicated by the detection information;
automatically selecting a specific scene composition from among a plurality of scene composition candidates; and
controlling the zoom magnification based on the specific scene composition selected by the selecting step,
wherein when a plurality of subject images is detected from the image, the zoom magnification is controlled to change the zoom magnification in accordance with a switch to a first state from a second state, and
wherein the first state is a state of the photographing target subject is designated in the designating step, and the second state is a state of the photographing target subject is not designated in the designating step.

19. A non-transitory recording medium recording a control program of a zoom control device which causes a computer to perform each step of a control method for the zoom control device, the method comprising:
acquiring detection information of a subject image detected from an image;
designating a photographing target subject from the subject image indicated by the detection information;
automatically selecting a specific scene composition from among a plurality of scene composition candidates; and
controlling the zoom magnification based on the specific scene composition selected by the selecting step,
wherein when a plurality of subject images is detected from the image, the zoom magnification is controlled to change the zoom magnification in accordance with a switch to a first state from a second state, and
wherein the first state is a state of the photographing target subject is designated in the designating step, and the second state is a state of the photographing target subject is not designated in the designating step.

* * * * *